United States Patent
Chen et al.

(10) Patent No.: US 12,392,653 B1
(45) Date of Patent: Aug. 19, 2025

(54) WATER LEVEL DETECTION METHOD, DEVICE, EQUIPMENT, STORAGE MEDIUM AND SYSTEM

(71) Applicant: SHENYANG RMS MEDICAL TECH CO., LTD, Liaoning (CN)

(72) Inventors: Shaochun Chen, Liaoning (CN); Xuchen Lu, Liaoning (CN); Xiaoyu Feng, Liaoning (CN); Fanyue Ji, Liaoning (CN); Yingxin Xie, Liaoning (CN); Chengguang Zhou, Liaoning (CN); Mingyi Sun, Liaoning (CN); Jing Ren, Liaoning (CN); Wenhua Yu, Liaoning (CN)

(73) Assignee: SHENYANG RMS MEDICAL TECH CO., LTD, Shenyang (CN)

( * ) Notice: Subject to any disclaimer, the term of this patent is extended or adjusted under 35 U.S.C. 154(b) by 0 days.

(21) Appl. No.: 19/068,439

(22) Filed: Mar. 3, 2025

(30) Foreign Application Priority Data

Apr. 16, 2024 (CN) .......................... 202410451433.2

(51) Int. Cl.
  *G01F 23/68* (2006.01)
  *G01F 23/80* (2022.01)
  *G08B 21/18* (2006.01)

(52) U.S. Cl.
  CPC .......... *G01F 23/686* (2013.01); *G01F 23/804* (2022.01); *G08B 21/182* (2013.01)

(58) Field of Classification Search
  CPC .............. A61M 16/16; A61M 2205/15; A61M 2230/40; G01F 23/686; G01F 23/804; G08B 21/182
  See application file for complete search history.

(56) References Cited

U.S. PATENT DOCUMENTS

| | | | |
|---|---|---|---|
| 2010/0322462 A1 | 12/2010 | Wu et al. | |
| 2017/0311879 A1* | 11/2017 | Armitstead | ............ G16H 20/40 |
| 2023/0314017 A1* | 10/2023 | Zhu | ............ F24F 6/12 |
| | | | 261/72.1 |

FOREIGN PATENT DOCUMENTS

| | | |
|---|---|---|
| CN | 101038198 A | 9/2007 |
| CN | 103679119 A | 3/2014 |

(Continued)

OTHER PUBLICATIONS

Lina, Cao, et al. "Study on image display for pipeline magnetic flux leakage data processing", Electronic Measurement Technology, Feb. 2007, pp. 162-164, https://www.cnki.net/KCMS/detail/detail.aspx?dbcode=CJFD&dbname=CJFD2007&filename=DZCL200702051&uniplatform=OVERSEA&v=VDS9EzuHuwXsAc7zWovekmEqNJK1Zc0d5aqYms_nD6iyryKFwmhnfNS2OqT0SGVH.

(Continued)

*Primary Examiner* — Dung Hong
(74) *Attorney, Agent, or Firm* — Jacob M. Ward; Ward Law Office LLC

(57) ABSTRACT

A water level detection method, device, equipment, storage medium and system, which are applied to a respiratory humidification apparatus, the respiratory humidification apparatus including a humidification chamber that includes a float, where the method includes: obtaining a float position image captured by a current camera; performing a grayscale processing on the float position image to obtain a current grayscale image data; generating a grayscale reference line and a grayscale image curve based on the current grayscale image data, where the grayscale image curve is a relationship curve between the current grayscale image data and a height value of the humidification chamber; determining a height value of the float according to a relative position (Continued)

relationship between the grayscale reference line and the grayscale image curve.

20 Claims, 5 Drawing Sheets

(56) References Cited

FOREIGN PATENT DOCUMENTS

| | | | | | |
|---|---|---|---|---|---|
| CN | 106197612 | A | | 12/2016 | |
| CN | 106774042 | A | * | 5/2017 | |
| CN | 108036837 | A | * | 5/2018 | ........ A61M 16/0003 |
| CN | 114359841 | A | * | 4/2022 | |
| CN | 114550026 | A | | 5/2022 | |
| CN | 114697560 | A | | 7/2022 | |
| CN | 115129063 | A | | 9/2022 | |
| CN | 115760850 | A | | 3/2023 | |
| CN | 116046099 | A | * | 5/2023 | |
| CN | 116259008 | A | * | 6/2023 | |
| CN | 116721089 | A | | 9/2023 | |
| CN | 116823802 | A | | 9/2023 | |
| CN | 219941524 | U | | 11/2023 | |
| CN | 118052820 | A | | 5/2024 | |

OTHER PUBLICATIONS

Notification of grant of priority application dated May 28, 2024 for Chinese patent application No. 202410451433.2 filed Apr. 16, 2024.
Written Opinion of the International Searching Authority for PCT/CN2025/089254 dated Jul. 4, 2025.

* cited by examiner

WATER LEVEL DETECTION METHOD, DEVICE, EQUIPMENT, STORAGE MEDIUM AND SYSTEM

CROSS-REFERENCE TO RELATED APPLICATION

This application claims priority to Chinese Patent Application No. 202410451433.2, filed on Apr. 16, 2024, which is hereby incorporated by reference in its entirety.

TECHNICAL FIELD

The present application relates to the technical field of water level monitoring of respiratory humidification apparatuses, and in particular to a water level detection method, device, equipment, storage medium and system.

BACKGROUND

Respiratory humidification apparatus is usually used in conjunction with a gas source to provide patients with heated and humidified respiratory gas to maintain the normal clearance function of the mucus ciliary system on the airway surface and the physiological conditions necessary for the normal contraction and diffusion characteristics of the alveolar epithelium and to reduce airway dryness and inflammatory symptoms. The humidification device in the respiratory humidification apparatus includes a humidification chamber. The water in the humidification chamber is heated by a heating plate in use, causing the airflow to carry water vapor and transport it to the patient through a heated breathing tube.

In practice, the humidification chamber cannot be filled with water in time, and the humidification chamber may dry out. On one hand, this will not be able to meet the patient's physiological needs for respiratory temperature and humidity, which will cause the respiratory tract and lung to be too dry, causing physiological impact on the patient; and on the other hand, it will affect the life of the respiratory humidification apparatus.

In the existing technology, the water level is estimated based on the power of the heating plate after obtaining the gas outlet temperature of the humidification chamber and the temperature of the heating plate. In this case, the parameters required for water level detection are greatly affected by the environment, and the accuracy of water level detection is poor; furthermore, this method is to indirectly infer the water level by measurement of the temperature, the water level detection taking a long time and the condition of water storage in the humidification chamber not being able to be detected in time. The safety and reliability of the respiratory humidification apparatus are poor.

SUMMARY

The present application provides a water level detection method, device, equipment, storage medium and system, aiming to solve the problem of poor safety and reliability of respiratory humidification apparatus.

In a first aspect, the present application provides a water level detection method, applied to respiratory humidification apparatus, the respiratory humidification apparatus including a humidification chamber and the humidification chamber including a float, the method including: obtaining a float position image captured by a current camera; performing a grayscale processing on the float position image to obtain a current grayscale image data, where the current grayscale image data is a grayscale value of each unit height of the humidification chamber in a grayscale image corresponding to the float position image; generating a grayscale reference line and a grayscale image curve based on the current grayscale image data, where the grayscale image curve is a relationship curve between the current grayscale image data and a height value of the humidification chamber; determining a height value of the float according to a relative position relationship between the grayscale reference line and the grayscale image curve.

In some feasible implementations, before generating the grayscale reference line and the grayscale image curve based on the current grayscale image data, the method further includes: determining current grayscale image parameters based on the current grayscale image data. The current grayscale image parameters include a minimum value and an average value of the current grayscale image data. The grayscale reference line includes a first sub-grayscale reference line, a second sub-grayscale reference line and a third sub-grayscale reference line; generating the grayscale reference line based on the current grayscale image data includes: selecting a first threshold value, a second threshold value, and a third threshold value from a numerical interval corresponding to the minimum value and the average value of the current grayscale image data; generating a first sub-grayscale reference line, a second sub-grayscale reference line and a third sub-grayscale reference line by respectively using the first threshold value, the second threshold value and the third threshold value as a segmentation reference. Determining the height value of the float according to the relative position relationship between the grayscale reference line and the grayscale image curve includes: performing a segmentation processing on the grayscale image curve by respectively using the first sub-grayscale reference line, the second sub-grayscale reference line, and the third sub-grayscale reference line as a segmentation reference line, to obtain a first number of segment, a second number of segment, and a third number of segment, where the segmentation processing includes: under each segmentation reference line, dividing the grayscale image curve by the segmentation reference line, and counting number of segment located below the segmentation reference line; determining an intersection point of each of the first sub-grayscale reference line, the second sub-grayscale reference line and the third sub-grayscale reference line with the grayscale image curve, and recording the height value of the humidification chamber corresponding to each intersection point; and determining the height value of the float from the height value of the humidification chamber corresponding to each intersection point according to the first number of segment, the second number of segment, and the third number of segment.

In some feasible implementations, determining the height value of the float from the height value of the humidification chamber corresponding to each intersection point according to the first number of segment, the second number of segment, and the third number of segment includes: if the first number of segment, the second number of segment and the third number of segment are all 1, using the height value of the humidification chamber corresponding to first intersection point between the grayscale image curve and the first sub-grayscale reference line as the height value of the float; otherwise, using the height value of the humidification chamber corresponding to first intersection point between the grayscale image curve and the second sub-grayscale reference line as the height value of the float.

In some feasible implementations, selecting the first threshold, the second threshold and the third threshold from the numerical interval corresponding to the minimum value and the average value of the current grayscale image data includes: calculating an average value of the average value of the current grayscale image data and the minimum value of the current grayscale image data to obtain the first threshold; calculating an average value of the minimum value of the current grayscale image data and the first threshold to obtain the second threshold; and calculating an average value of the minimum value of the current grayscale image data and the second threshold to obtain the third threshold.

In some feasible implementations, the current grayscale image parameters further include a maximum value of the current grayscale image data; and before generating the grayscale reference line and the grayscale image curve based on the current grayscale image data, the method further includes: determining whether the current grayscale image parameters are all within a preset grayscale range; if the current grayscale image parameters are not all within the preset grayscale range, adjusting exposure time of a fill light lamp according to the current grayscale image parameters, and returning to perform the step of obtaining the float position image captured by the current camera; and generating the grayscale reference line and the grayscale image curve based on the current grayscale image data specifically includes: if the current grayscale image parameters are all within the preset grayscale range, generating the grayscale reference line and the grayscale image curve based on the current grayscale image data.

In some feasible implementations, adjusting the exposure time of the fill light lamp according to the current grayscale image parameters includes: if the maximum value of the current grayscale image data is less than a lower limit of the preset grayscale range, determining whether current exposure time of the fill light lamp reaches an upper limit of the exposure time, and if reached, maintaining the current exposure time of the fill light lamp, and otherwise, increasing the exposure time of the fill light lamp; and if the minimum value of the current grayscale image data is greater than the upper limit of the preset grayscale range, reducing the exposure time of the fill light lamp.

In some feasible implementations, after determining the height value of the float according to the relative position relationship between the grayscale reference line and the grayscale image curve, the method further includes: determining a current water level height value of the humidification chamber according to a current height value of the float, where the height value of the float is a height value of the float relative to bottom of the humidification chamber; and if the current water level height value of the humidification chamber is less than a warning height value, outputting a warning signal.

In some feasible implementations, before determining the height value of the float according to the relative position relationship between the grayscale reference line and the grayscale image curve, the method further includes: performing a smoothing processing on the grayscale image curve to obtain a smoothed grayscale image curve. Determining the height value of the float according to the relative position relationship between the grayscale reference line and the grayscale image curve specifically includes: determining the height value of the float according to a relative position relationship between the grayscale reference line and the smoothed grayscale image curve.

In a second aspect, the present application provides a water level detection device, applied to a respiratory humidification apparatus, the respiratory humidification apparatus including a humidification chamber, and the humidification chamber including a float, the device including: an acquisition module, configured to acquire a float position image captured by a current camera; a processing module, configured to perform a grayscale processing on the float position image to obtain a current grayscale image data, where the current grayscale image data is a grayscale value of each unit height of the humidification chamber in a grayscale image corresponding to the float position image; a generation module, configured to generate a grayscale reference line and a grayscale image curve based on the current grayscale image data, where the grayscale image curve is a relationship curve between the current grayscale image data and a height value of the humidification chamber; and a determination module, configured to determine a height value of the float according to a relative position relationship between the grayscale reference line and the grayscale image curve.

In some feasible implementations, the device further includes: an extraction module, configured to determine current grayscale image parameters according to the current grayscale image data, where the current grayscale image parameters include a minimum value and an average value of the grayscale image data; the grayscale reference line includes a first sub-grayscale reference line, a second sub-grayscale reference line and a third sub-grayscale reference line; the generation module includes: a selection unit, configured to select a first threshold, a second threshold and a third threshold from a numerical interval corresponding to the minimum value and the average value of the current grayscale image data; a generation unit, configured to generate the first sub-grayscale reference line, the second sub-grayscale reference line and the third sub-grayscale reference line by respectively using the first threshold, the second threshold and the third threshold as a segmentation reference; the determination module includes: a segmentation processing unit, configured to perform a segmentation processing on the grayscale image curve by respectively using the first sub-grayscale reference line, the second sub-grayscale reference line, and the third sub-grayscale reference line as a segmentation reference line, to obtain a first number of segment, a second number of segment and a third number of segment, where the segmentation processing includes: under each segmentation reference, dividing the grayscale image curve by the segmentation reference line, and counting number of segment located below the segmentation reference line; a recording unit, configured to determine an intersection point of each of the first sub-grayscale reference line, the second sub-grayscale reference line and the third sub-grayscale reference line with the grayscale image curve, and record the height value of the humidification chamber corresponding to each intersection point; and a determination unit, configured to determine the height value of the float from the height value of the humidification chamber corresponding to each intersection point according to the first number of segment, the second number of segment, and the third number of segment.

In some feasible implementations, the determination unit is specifically configured to: if the first number of segment, the second number of segment and the third number of segment are all 1, use the height value of the humidification chamber corresponding to first intersection point of the grayscale image curve and the first sub-grayscale reference line as the height value of the float; otherwise, use the height value of the humidification chamber corresponding to first intersection point of the grayscale image curve and the second sub-grayscale reference line as the height value of the float.

In some feasible implementations, the selection unit is configured to: calculate an average value of the average value of the current grayscale image data and the minimum value of the current grayscale image data to obtain the first threshold; calculate an average value of the minimum value of the current grayscale image data and the first threshold value to obtain the second threshold value; and calculate an average value of the minimum value of the current grayscale image data and the second threshold value to obtain the third threshold.

In some feasible implementations, the current grayscale image parameters also include a maximum value of the current grayscale image data; the device further includes: a judgment module configured to determine whether the current grayscale image parameters are all within a preset grayscale range; and an adjustment module configured to, if the current grayscale image parameters are not all within the preset grayscale range, adjust exposure time of a fill light lamp according to the current grayscale image parameters, and return to perform the step of obtaining the float position image captured by the current camera; the generation module is specifically configured to: if the current grayscale image parameters are all within the preset grayscale range, generate the grayscale reference line and the grayscale image curve based on the current grayscale image data.

In some feasible implementations, the adjustment module is specifically configured to: if the maximum value of the current grayscale image data is less than a lower limit of the preset grayscale range, determine whether current exposure time of the fill light lamp reaches an upper limit of the exposure time, and if so, maintain the current exposure time of the fill light lamp, otherwise, increase the exposure time of the fill light lamp; and if the minimum value of the current grayscale image data is greater than an upper limit of the preset grayscale range, reduce the exposure time of the fill light lamp.

In some feasible implementations, the device further includes: a warning module, configured to: determine a current water level height value of the humidification chamber according to the current height value of the float; where the height value of the float is a height value of the float relative to bottom of the humidification chamber; and if the current water level height value of the humidification chamber is less than a warning height value, output a warning signal.

In some feasible implementations, the device further includes: a preprocessing module, configured to: perform a smoothing processing on the grayscale image curve to obtain a smoothed grayscale image curve; and determining the height value of the float according to the relative position relationship between the grayscale reference line and the grayscale image curve specifically includes: determining the height value of the float according to a relative position relationship between the grayscale reference line and the smoothed grayscale image curve.

In a third aspect, the present application provides electronic equipment, including: a processor, and a memory communicatively connected to the processor, where the memory stores computer executable instructions, and the processor executes the computer executable instructions stored in the memory to implement the method as described above.

In a fourth aspect, the present application provides a computer-readable storage medium, where the computer-readable storage medium stores computer executable instructions that, when executed by a processor, implement the method as described above.

In a fifth aspect, the present application provides a warning system, including the water level detection method as mentioned above and the water level detection device as mentioned above.

In the water level detection method, device, equipment, storage medium and system provided by the present application, it involves obtaining a float position image captured by a current camera; performing a grayscale processing on the float position image to obtain a current grayscale image data, where the current grayscale image data is a grayscale value of each unit height of the humidification chamber in a grayscale image corresponding to the float position image; generating a grayscale reference line and a grayscale image curve based on the current grayscale image data, where the grayscale image curve is a relationship curve between the current grayscale image data and a height value of the humidification chamber; determining a height value of the float according to a relative position relationship between the grayscale reference line and the grayscale image curve. In the solution of the present application, the float position image captured by the camera is subjected to the grayscale processing to obtain the current grayscale image data, the grayscale reference line and grayscale image curve are generated based on the grayscale image data, then according to the relative position relationship between the grayscale reference line and grayscale image curve, the height of float can be determined. In fact, float is located at the upper water level in the humidification chamber. Thus the height value of float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus.

BRIEF DESCRIPTION OF DRAWINGS

The accompanying drawings, which are incorporated in and constitute a part of this description, illustrate embodiments consistent with the present application and together with the description, serve to explain the principles of the present application.

Figure 1:
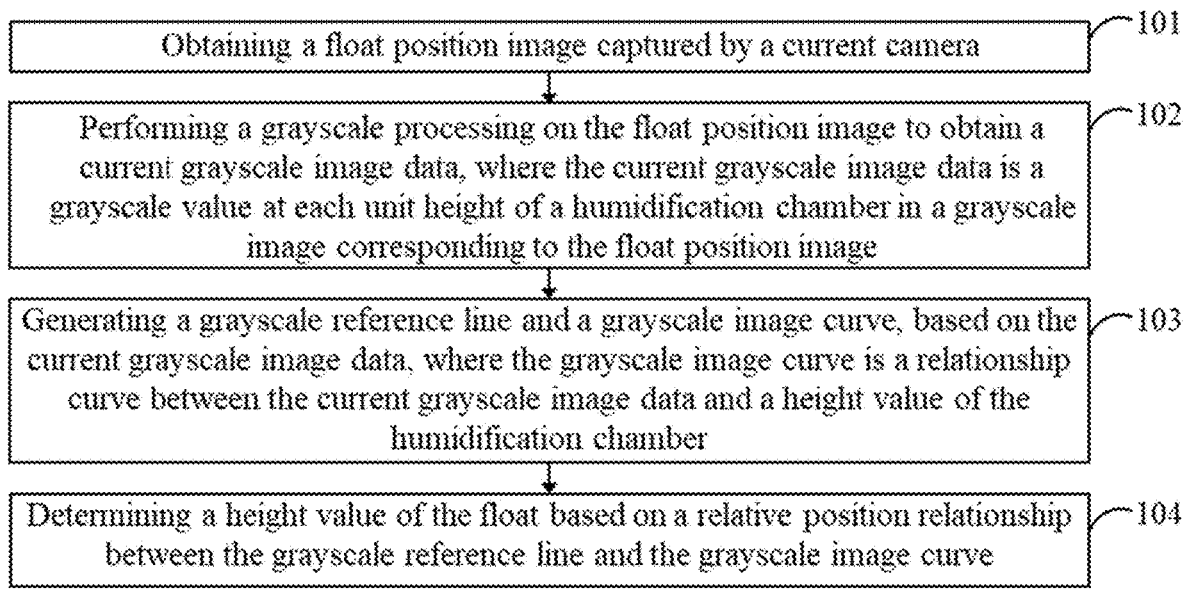
FIG. 1 is a schematic flow chart of a water level detection method provided in Embodiment 1 of the present application.

Through the above-mentioned drawings, definite embodiments of the present application have been shown, and will be described in more detail below. These drawings and text descriptions are not intended to limit the scope of the concepts of the present application in any way, but rather to illustrate the concepts of the present application to those skilled in the art with reference to specific embodiments.

DESCRIPTION OF EMBODIMENTS

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with the present application. Rather, they are merely examples of device and methods consistent with aspects of the present application as detailed in the appended claims.

It should be noted that the brief description of terms in the present application is only to facilitate understanding of the embodiments described below, and is not intended to limit the embodiments of the present application. Unless otherwise stated, these terms should be understood according to their ordinary and usual meaning.

The terms "first", "second", etc. in the description and claims of the present application and the above-mentioned drawings are used to distinguish similar or congeneric objects or entities, and do not necessarily mean to limit a specific order or sequence unless otherwise indicated. It should be understood that the terms so used are interchangeable where appropriate, for example, being able to be implemented in an order other than those given in illustrations or description of the embodiments of the present application.

In addition, the terms "include" and "have" and any variations thereof means covering but non-exclusive inclusion, for example, a product or device that includes a range of components need not be limited to those components explicitly listed, but may include other component not expressly listed or inherent to the product or device. The term "module", as used in the present application, means any known or later developed hardware, software, firmware, artificial intelligence, fuzzy logic or a combination of hardware or/and software codes capable of performing the function associated with the element.

Respiratory humidification apparatus is usually used in conjunction with a gas source to provide patients with heated and humidified respiratory gas to maintain the normal clearance function of the mucus ciliary system on the airway surface and the physiological conditions necessary for the normal contraction and diffusion characteristics of the alveolar epithelium and to reduce airway dryness and inflammatory symptoms. The humidification device in the respiratory humidification apparatus includes a humidification chamber. The water in the humidification chamber is heated by a heating plate in use, causing the airflow to carry water vapor and transport it to the patient through a heated breathing tube.

In practice, the humidification chamber cannot be filled with water in time, and the humidification chamber may dry out. On one hand, this will not be able to meet the patient's physiological needs for respiratory temperature and humidity, which will cause the respiratory tract and lung to be too dry, causing physiological impact on the patient; and on the other hand, the humidification chamber is an easily consumable material with an average lifespan of 1-2 weeks, and if it is frequently dry-burned, the life of the respiratory humidification apparatus will be affected.

In the existing technology, the water level is estimated based on the power of the heating plate after obtaining the gas outlet temperature of the humidification chamber and the temperature of the heating plate. In this case, the parameters required for water level detection are greatly affected by the environment, and the accuracy of water level detection is poor; furthermore, this method is to indirectly infer the water level by measurement of the temperature, the water level detection taking a long time and the condition of water storage in the humidification chamber not being able to be detected in time. It was found in actual measurements that when the humidification chamber is short of water, it will still run for a period of time before warning. Thus the respiratory humidification apparatus has poor safety and reliability.

The technical contents provided by the present application are intended to solve the above technical problems of related technologies. In embodiments of the present application, a position image of a float, as captured by a camera, is grayscaled to obtain a current grayscale image data, and a grayscale reference line and a grayscale image curve are generated based on the grayscale image data, and then a height value of the float can be determined according to a relative position between the grayscale reference line and the grayscale image curve. In fact, the float is located at an upper water level in the humidification chamber, and thus the height value of the float is a water level height value of the humidification chamber. Therefore, the solutions of the present application can, based on image processing technology, avoid the influence of environmental factors and can timely and accurately detect the water level of the humidification chamber without indirect deduction process, improving the reliability and safety of the respiratory humidification apparatus.

The technical solutions of the present application will be described in detail below with reference to specific embodiments. The following specific embodiments can be combined with each other, and the same or similar concepts or processes may not be repeated in some embodiments. In the description of the present application, unless otherwise expressly stated or limited, each term should be interpreted broadly in the art. The embodiments of the present application will be described below with reference to the accompanying drawings.

Embodiment 1

FIG. 1 is a flow chart of a water level detection method provided in Embodiment 1 of the present application. The water level detection method in this embodiment is applied to a respiratory humidification apparatus. The respiratory humidification apparatus includes a humidification chamber, and the humidification chamber includes a float, as shown in FIG. 1, the water level detection method provided by this embodiment includes the following steps:

Step 101: Obtaining a float position image captured by the current camera;

Step 102: Performing a grayscale processing on the float position image to obtain a current grayscale image data, where the current grayscale image data is a grayscale value at each unit height of the humidification chamber in a grayscale image corresponding to the float position image;

Step 103: Generating a grayscale reference line and a grayscale image curve based on the current grayscale image data, where the grayscale image curve is a relationship curve between the current grayscale image data and a height value of the humidification chamber; and Step 104: Determining a height value of the float according to the relative position relationship between the grayscale reference line and the grayscale image curve.

In practical applications, an execution subject of the water level detection method can be a water level detection device, and the water level detection device can be implemented in many ways. For example, it can be implemented through a computer program, such as application software, or, such as a chip. It can also be implemented as a medium storing a relevant computer program, such as a USB disk, a cloud disk, or it can also be implemented through a physical device integrated or installed with a relevant computer program, such as a server.

Figure 2:
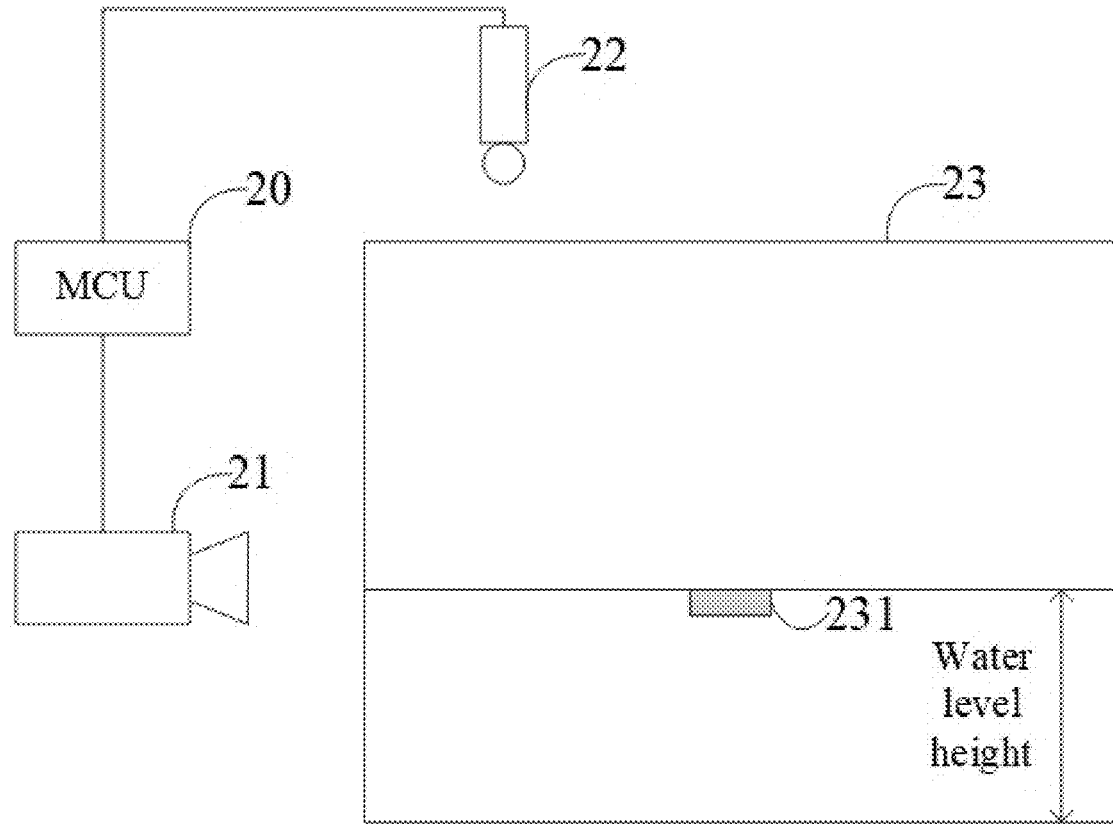
FIG. 2 is a schematic structural diagram of a water level detection system provided in Embodiment 1 of the present application.

Exemplarily, the water level detection device can be a microcontroller unit (MCU). FIG. 2 is a schematic structural diagram of a water level detection system provided in Embodiment 1 of the present application. As shown in FIG. 2, the water level detection system includes a microcontroller unit 20, a camera 21, a fill light lamp 22 and a humidification chamber 23. The humidification chamber 23 includes a float 231. Among them, the camera 21 is arranged at a side of the humidification chamber 23, and the camera 21 is used to capture a position image of the float, and the fill light lamp 22 is used to provide auxiliary light for the camera 21 when shooting in weak light conditions to obtain a suitable position image of the float. The float 231 is located at an upper water level in the humidification chamber 23, and the height value of the float 231 is the height value of the float 231 relative to the bottom of the humidification chamber 23. Therefore, in this embodiment, a water level value of the humidification chamber 23 can be determined by the height value of the float 231.

Specifically, step 101 is to obtain a position image of the float as captured by a current camera. For example, the camera captures the float position image in real time, and the water level detection device obtains in real time the float position image captured by the current camera. For another example, the camera can periodically take pictures of the position of the float. The water level detection device can set a shooting period according to an actual need. The water level detection device controls the camera to take pictures of the position of the float when the shooting time comes. The water level detection device obtains the float position image captured by the current camera.

In an implementation, for a respiratory humidification apparatus that is manually filled with water, in order to save the cost of water level detection, when the water level in the humidification chamber is high, water level detection is not performed or a large shooting period is set. Exemplarily, after adding water to the humidification chamber, the water level detection device sets a start time of water level detection according to a current power of the respiratory humidification apparatus. For example, when the power of the respiratory humidification apparatus is large, the start time of water level detection is set to be earlier; and when the power of the respiratory humidification apparatus is small, the start time of water level detection is set to be later.

In this embodiment, the grayscale processing in step 102 refers to a process of converting the float position image into a corresponding grayscale image. A grayscale image is an image with only one sample color per pixel. A grayscale image is usually shown as a scale of gray between black and white. Grayscale images also have many levels of color depth between black and white. Grayscale images are usually obtained by measuring the brightness of each pixel within a single electromagnetic spectrum, such as visible light. Grayscale images for display are usually saved with a nonlinear scale of 8 bits per sample pixel, having 256 levels of grayscale (there are 65536 levels of grayscale if 16 bits are used). The grayscale image occupies less memory than the float position image and can increase the speed of water level detection. After converting the float position image into the corresponding grayscale image, the grayscale image can increase visual contrast, highlight the target area, and determine the float's position more accurately and quickly.

Further, after converting the float position image into the corresponding grayscale image, each pixel includes a grayscale value. In this embodiment, the unit height of the humidification chamber includes at least one row of pixels. The unit height of the humidification chamber can be set according to actual needs. The grayscale values of all pixels under the unit height of the humidification chamber are close to each other. The average grayscale value of all pixels under unit height of the humidification chamber can be taken as the grayscale value under unit height of the humidification chamber.

Specifically, in step 103, the grayscale reference line is generated based on the grayscale image data, and the grayscale reference line is used as a standard for determining the size of the grayscale values on the grayscale image curve. In practice, the water in the humidification chamber is colorless, and the grayscale value of the float in the grayscale image is greater than the grayscale values of other positions in the grayscale image. Therefore, the grayscale value of a part of the grayscale image curve located below the grayscale reference line is a corresponding grayscale value of a part where the float is located in the float position image.

Further, in step 104, the height value of the float is determined according to the relative position relationship between the grayscale reference line and the grayscale image curve. Specifically, a rectangular coordinate system is established, where the abscissa is the height value of the humidification chamber, the ordinate is the grayscale value, and the part of the grayscale image curve located below the grayscale reference line is obtained, where both ends of the part of the grayscale image curve intersect with the grayscale reference line, and the height value of the humidification chamber corresponding to first intersection point is taken as the height value of the float. It can be understood that, a grayscale reference line and a grayscale image curve are generated based on a current grayscale image data, and the height value of the float can be obtained quickly based on a relative position between the grayscale reference line and the grayscale image curve.

In this embodiment, the float position image captured by the camera is grayscaled to obtain the current grayscale image data, and a grayscale reference line and grayscale image curve are generated based on the grayscale image data, and the height value of the float can be determined according to the relative position relationship between the grayscale reference line and the grayscale image curve. In practice, the float is located at the upper water level in the humidification chamber, and the height value of the float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus.

Figure 3:
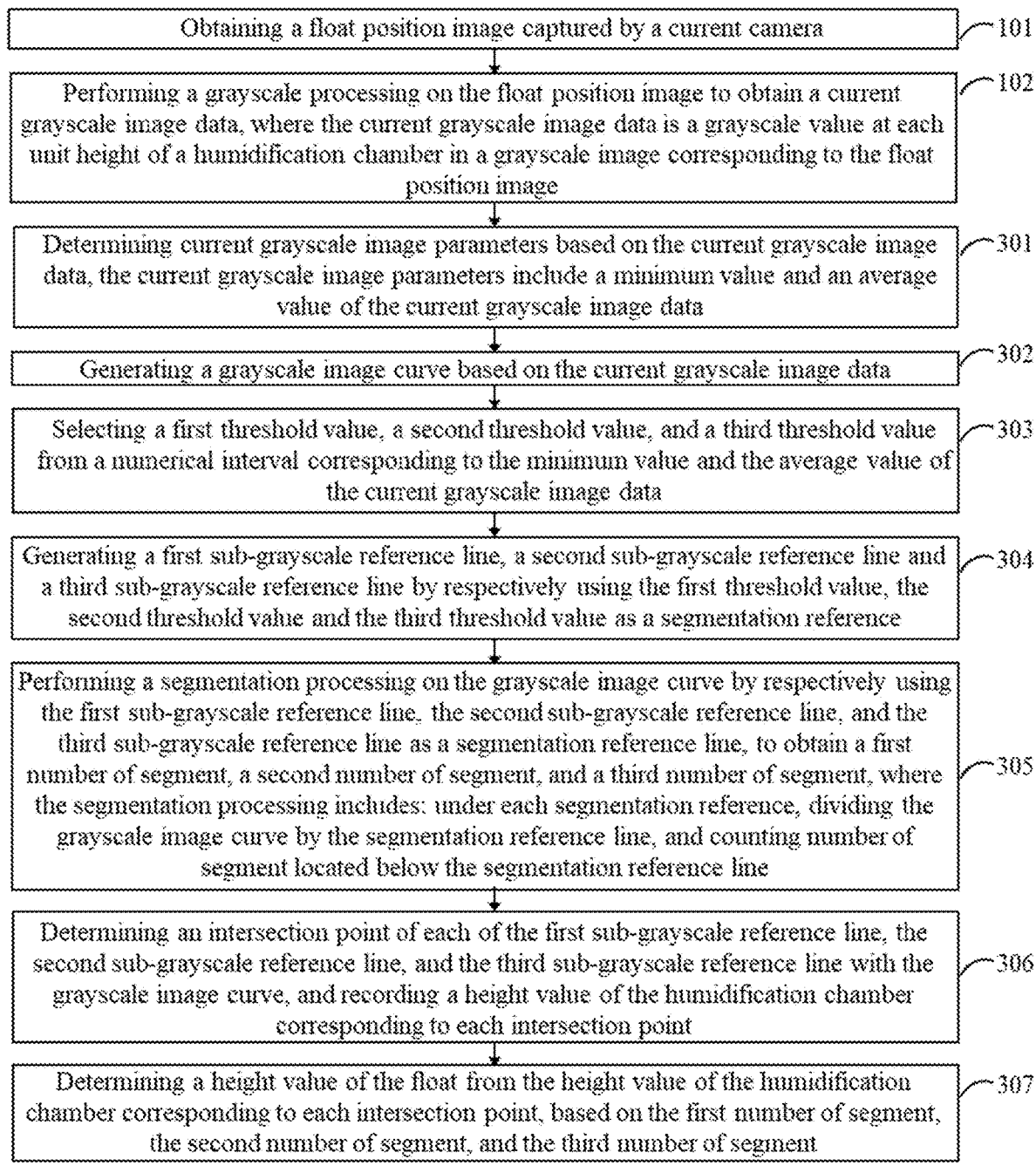
FIG. 3 is a schematic flow chart of another water level detection method provided in Embodiment 1 of the present application.

Based on the above description, the grayscale value of the part of the grayscale image curve located below the grayscale reference line is the grayscale value corresponding to the part where the float is located in the float position image. In practical applications, the float may have one part located underwater and another part located above the water. In this embodiment, the height value of the float is equal to the water level height value of the humidification chamber. Furthermore, in order to more accurately detect the water level of the humidification chamber, multiple sub-grayscale reference lines are set, and according to a relative position relationship between the grayscale image curve and the multiple sub-grayscale reference lines, the height value of the float is determined. Based on the above embodiments, in a feasible implementation, FIG. 3 is a schematic flow chart of another water level detection method provided in Embodiment 1 of the present application. As shown in FIG. 3, before the above step 103, the method further includes:

Step 301: Determining the current grayscale image parameters according to the current grayscale image data, where the current grayscale image parameters include a minimum value and an average value of the current grayscale image data;

the above-mentioned grayscale reference line includes a first sub-grayscale reference line, a second sub-grayscale reference line and a third sub-grayscale reference line; and the above step 103 includes:

Step 302: Generating a grayscale image curve based on the current grayscale image data;

Step 303: Selecting a first threshold, a second threshold and a third threshold from a numerical interval corresponding to the minimum value and the average value of the current grayscale image data; and Step 304: Generating the first sub-grayscale reference line, the second sub-grayscale reference line and the third sub-grayscale reference line by using the first threshold, the second threshold and the third threshold respectively as a segmentation reference;

the above step 104 includes:

Step 305: Performing a segmentation processing on the grayscale image curve by using the first sub-grayscale reference line, the second sub-grayscale reference line, and the third sub-grayscale reference line respectively as a segmentation reference line, to obtain a first number of segment, a second number of segment and a third number of segment, where the segmentation processing includes: under each segmentation reference line, dividing the grayscale image curve by the segmentation reference line, and counting the number of segment located below the segmentation reference line;

Step 306: Determining an intersection point of each of the first sub-grayscale reference line, the second sub-grayscale reference line, and the third sub-grayscale reference line with the grayscale image curve, and recording a height value of the humidification chamber corresponding to each intersection point; and Step 307: Determining the height value of the float from the height value of the humidification chamber corresponding to each intersection point, based on the first number of segment, the second number of segment, and the third number of segment.

It can be understood that step 301 is to determine the minimum value and the average value of the current grayscale image data according to the current grayscale image data. Where the minimum value of the current grayscale image data can be obtained through direct search. For example, the water level detection device stores a computer program for finding the minimum value, and the minimum value of the current grayscale image data is obtained by looking up the current grayscale image data by calling the computer program. For another example, the water level detection device includes a minimum value search module, and by inputting the current grayscale image data into the minimum value search module, the minimum value of the current grayscale image data outputted by the minimum value search module can be obtained. Where the minimum value of the current grayscale image data can be calculated. For example, the water level detection device stores a computer program for calculating the minimum value, and the average value of the current grayscale image data can be calculated by calling the computer program. For another example, the water level detection device includes an average value calculation module, and by inputting the current grayscale image data into the average value calculation module, the average value of the current grayscale image data output by the average value calculation module can be obtained.

Combined with the above description, the current grayscale image data is a grayscale value of each unit height of the humidification chamber in the grayscale image corresponding to the float position image. Specifically, step 302 is to generate a grayscale image curve based on the current grayscale image data. For example, the height value of the humidification chamber is used as the abscissa and the grayscale value is used as the ordinate to establish a rectangular coordinate system, and the current grayscale image data is fitted to generate the grayscale image curve.

Specifically, in step 303, the first threshold, the second threshold and the third threshold are selected from the numerical interval corresponding to the minimum value and the average value of the current grayscale image data. In practice, the first threshold, the second threshold, and the third threshold may be any three values selected from the above numerical interval, or may be selected according to a pre-specified rule. This is not specifically limited here. In one example, the above step 303 includes:

calculating an average value of the average value of the current grayscale image data and the minimum value of the current grayscale image data to obtain the first threshold;

calculating an average value of the minimum value of the current grayscale image data and the first threshold to obtain the second threshold; and calculating an average value of the minimum value of the current grayscale image data and the second threshold to obtain the third threshold.

For example, the average value of the current grayscale image data is 50, and the minimum value of the current grayscale image data is 40; an average value of the average value 50 of the current grayscale image data and the minimum value 40 of the current grayscale image data is calculated, obtaining the first threshold value 45; an average value of the first threshold value 45 and the minimum value 40 of the current grayscale image data is calculated, obtaining the second threshold value 42.5; and an average value of the second threshold value 42.5 and the minimum value 40 of the current grayscale image data, obtaining the third threshold 41.25.

In this embodiment, in order to more accurately detect the water level of the humidification chamber, three sub-grayscale reference lines are set, and the height value of the float is determined according to the relative position relationship between the grayscale image curve and multiple grayscale reference lines. In the rectangular coordinate system with the height value of the humidification chamber as the abscissa and the grayscale value as the ordinate, the three sub-grayscale reference lines are three straight lines parallel to the abscissa axis. The ordinate values corresponding to the three sub-grayscale reference lines are the first threshold, the second threshold and the third threshold, respectively. Specifically, in step 304, generating the first sub-grayscale reference line, the second sub-grayscale reference line and the third sub-grayscale reference line by respectively using the first threshold, the second threshold and the third threshold as a segmentation reference, includes: generating the first sub-grayscale reference line, the second sub-grayscale reference line and the third sub-grayscale reference line, ordinates of which are the first threshold, the second threshold and the third threshold, respectively, and which are parallel to the abscissa axis.

It should be noted that the number of sub-grayscale reference lines can be set according to actual needs and the current grayscale image data. In this implementation, setting three sub-grayscale reference lines is only an example. The number of sub-grayscale reference lines is not specifically limited.

Figure 4:
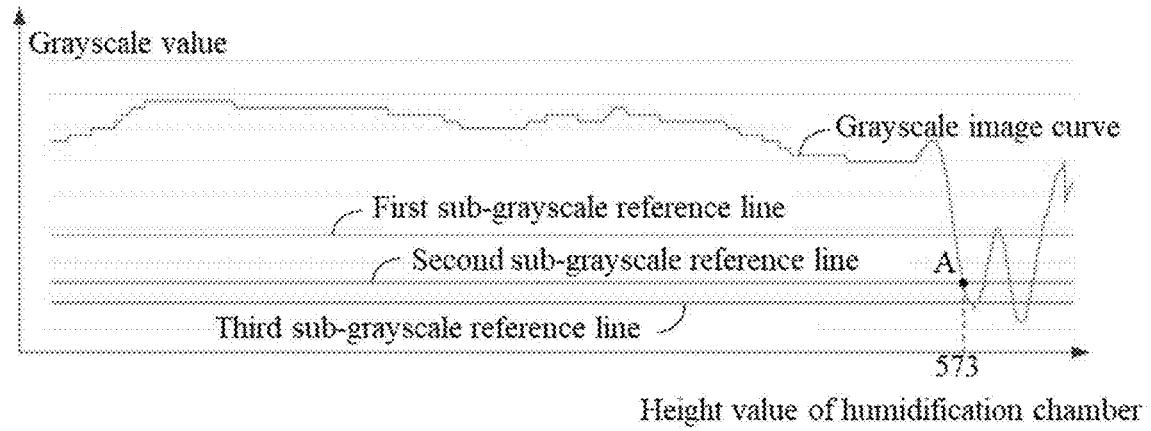
FIG. 4 is a schematic diagram of a grayscale image curve and a grayscale reference line for an upper water level, provided in Embodiment 1 of the present application.
Figure 5:
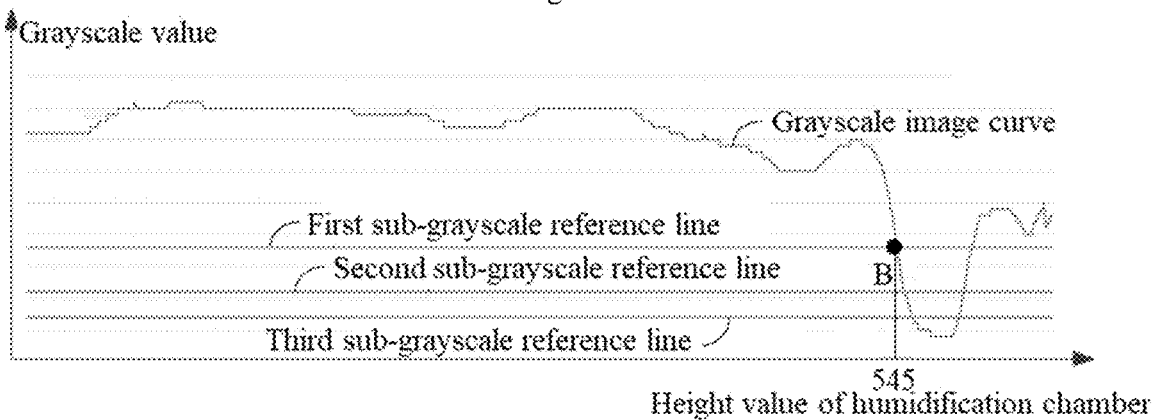
FIG. 5 is a schematic diagram of a grayscale image curve and a grayscale reference line for a middle water level, provided in Embodiment 1 of the present application.
Figure 6:
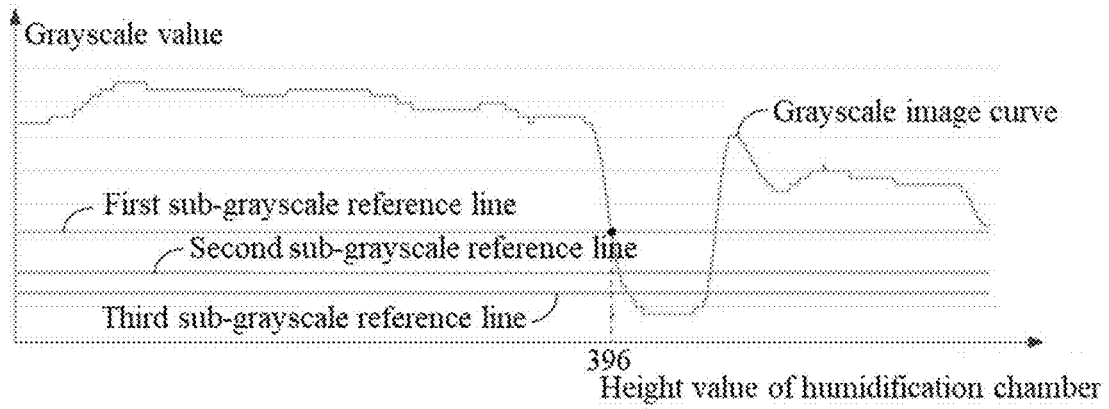
FIG. 6 is a schematic diagram of a grayscale image curve and a grayscale reference line for a lower water level, provided in Embodiment 1 of the present application.

The following illustrates, in conjunction with FIGS. 4, 5 and 6, how to determine the height value of the float based on the first sub-grayscale reference line, the second sub-grayscale reference line, and the third sub-grayscale reference line and the grayscale image curve. FIG. 4 is a schematic diagram of a grayscale image curve and a grayscale reference line for an upper water level, provided in Embodiment 1 of the present application; FIG. 5 is a schematic diagram of a grayscale image curve and a grayscale reference line for a middle water level, provided in Embodiment 1 of the present application; and FIG. 6 is a schematic diagram of a grayscale image curve and a grayscale reference line for a lower water level, provided in Embodiment 1 of the present application.

Specifically, in step 305, the first sub-grayscale reference line, the second sub-grayscale reference line, and the third sub-grayscale reference line are respectively used as a segmentation reference line to perform a segmentation processing on the grayscale image curve to obtain the first number of segment, the second number of segment, and the third number of segment. It can be understood that the first number of segment C1 is obtained by performing the segmentation processing on the grayscale image curve using the first sub-grayscale reference line as the segmentation reference line, and counting number of segment below the first sub-grayscale reference line; similarly, the second number of segment C2 is obtained by performing the segmentation processing on the grayscale image curve using the second sub-grayscale reference line as the segmentation reference line, and counting number of segment below the second sub-grayscale reference line; and the third number of segment C3 is obtained by performing the segmentation processing on the grayscale image curve using the third sub-grayscale reference line as the segmentation reference line, and counting number of segment below the third sub-grayscale reference line.

Exemplarily, the first threshold is T1, the second threshold is T2, and the third threshold is T3, T1>T2>T3, and an order of the three sub-grayscale reference lines is the first sub-grayscale reference line, the second sub-grayscale reference line, and the third sub-grayscale reference line from top to bottom. As shown in FIG. 4, the first sub-grayscale reference line is used as the segmentation reference line to segment the grayscale image, obtaining the first number of segment C1, which is 2; the second sub-grayscale reference line is used as the segmentation reference line to segment the grayscale image, obtaining the second number of segment C2, which is 2; and the third sub-grayscale reference line is used as the segmentation reference line to segment the grayscale image, obtaining the third number of segment C3, which is 2. As shown in FIG. 5, the first sub-grayscale reference line is used as the segmentation reference line to segment the grayscale image, obtaining the first number of segment C1, which is 1; the second sub-grayscale reference line is used as the segmentation reference line to segment the grayscale image, obtaining the second number of segment C2, which is 1; and the third sub-grayscale reference line is used as the segmentation reference line to segment the grayscale image, obtaining the third number of segment C3, which is 1. As shown in FIG. 6, the first sub-grayscale reference line is used as the segmentation reference line to segment the grayscale image, obtaining the first number of segment C1, which is 1; the second sub-grayscale reference line is used as the segmentation reference line to segment the grayscale image, obtaining the second number of segment C2, which is 1; and the third sub-grayscale reference line is used as the segmentation reference line to segment the grayscale image, obtaining the third number of segment C3, which is 1.

In practical applications, the first sub-grayscale reference line, the second sub-grayscale reference line and the third sub-grayscale reference line are all used to determine the height value of the float. It can be understood that there are multiple intersection points of the first sub-grayscale reference line, the second sub-grayscale reference line and the third sub-grayscale reference line with the grayscale image curve, and each intersection point corresponds to one height value of the humidification chamber, and the height value of the float is included in the height values of the humidification chamber corresponding to the multiple intersection points. Therefore, in step 306, after determining the intersection points of the first sub-grayscale reference line, the second sub-grayscale reference line, and the third sub-grayscale reference line with the grayscale image curve, the height value of the humidification chamber corresponding to each intersection point is recorded.

Furthermore, the height value of the float needs to be determined from the height values of the humidification chamber corresponding to the multiple intersection points. Specifically, in step 307, the height value of the float is determined from the height value of the humidification chamber corresponding to each intersection point based on the first number of segment, the second number of segment, and the third number of segment.

As an example, the above step 307 includes:
if the first number of segment, the second number of segment and the third number of segment are all 1, using the height value of the humidification chamber corresponding to first intersection point of the grayscale image curve and the first sub-grayscale reference line as the height value of the float; otherwise, using the height value of the humidification chamber corresponding to first intersection point of the grayscale image curve and the second sub-grayscale reference line as the height value of the float.

Specifically, a specific process of determining the height value of the float from the height value of the humidification chamber corresponding to each intersection point based on the first number of segment, the second number of segment and the third number of segment is exemplarily illustrated in combination with FIGS. 4, 5 and 6. In FIG. 4, the first number of segment C1, the second number of segment C2 and the third number of segment C3 are all 2, the height value of the humidification chamber corresponding to first intersection point A of the grayscale image curve and the second sub-grayscale reference line is used as the height value of the float, and as shown in FIG. 4, the height value of the humidification chamber corresponding to the point A is 573, then the height value of the float is 573, and the water level height value of the humidification chamber is 573. In FIG. 5, the first number of segment C1 is 1, the second number of segment C2 and the third number of segment C3 are both 1, the height value of the humidification chamber corresponding to first intersection point B of the grayscale image curve and the second sub-grayscale reference line is used as the height value of the float, and as shown in FIG. 5, the height value of the humidification chamber corresponding to the point B is 545, then the height value of the float is 545, and the water level height value of the humidification chamber is 545. In FIG. 6, the first number of segment C1, the second number of segment C2 and the third number of segment C3 are all 1, the height value of the humidification chamber corresponding to first intersection point C of the grayscale image curve and the first sub-grayscale reference line is used as the height value of the float, and as shown in FIG. 6, the height value of the humidification chamber corresponding to the point C is 396, then the height value of the float is 396, and the water level height value of the humidification chamber is 396.

In this implementation, first, the float position image captured by the camera is subjected to grayscale processing, to obtain a current grayscale image data; then, current grayscale image parameters are determined based on the current grayscale image data; then, a grayscale image curve is generated based on the current grayscale image data, and a first sub-grayscale reference line, a second sub-grayscale reference line and a third sub-grayscale reference line is generated according to the grayscale image parameters; finally, the height value of the float is determined according to a relative position relationship between the first sub-grayscale reference line, the second sub-grayscale reference line and the third sub-grayscale reference line with the grayscale image curve. In practice, the float is located at the upper water level in the humidification chamber, and the height value of the float is the height value of the water level of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus. Furthermore, in this embodiment, three sub-grayscale reference lines are set, which can more accurately detect the water level of the humidification chamber and improve the accuracy of water level detection.

Combined with the above description, the present application is to process the float position image captured by the current camera to achieve water level detection. In practical applications, when the light is dark, the float position image captured by the camera does not meet the needs of water level detection. In order to further improve the accuracy of water level detection, it is possible to determine whether the current float position image meets the requirements for water level detection. If it meets the requirements, the above water level detection steps can be performed to achieve water level detection; if not, the fill light lamp can be turned on until the current float position image meets the needs of water level detection. As an example, in a feasible implementation, the current grayscale image parameters further include the maximum value of the current grayscale image data; before the above step 103, the method further includes:

determining whether the current grayscale image parameters are all within a preset grayscale range;

if the current grayscale image parameters are not all within the preset grayscale range, adjusting the exposure time of the fill light lamp according to the current grayscale image parameters, and returning to perform the step of obtaining the float position image captured by the current camera;

the above step 103 specifically includes:

if the current grayscale image parameters are all within the preset grayscale range, generating a grayscale reference line and a grayscale image curve based on the current grayscale image data.

Where the grayscale range can be preset according to actual water level detection needs. It can be understood that if the current grayscale image parameters are all within the preset grayscale range, it indicates that the current float position image meets the needs of water level detection. Specifically, the grayscale reference line and the grayscale image curve are generated based on the current grayscale image data and the height value of the float is determined according to the relative position relationship between the grayscale reference line and the grayscale image curve.

Correspondingly, if the current grayscale image parameters are not all within the preset grayscale range, it indicates that the current float position image meets the needs of water level detection. Specifically, the fill light lamp is turned on, the exposure time of the fill light lamp is adjusted according to the current grayscale image parameters, and the float position image is re-captured by the camera until the current float position image meets the requirements for water level detection, and then, based on the float position image re-captured by the camera, subsequent water level detection steps are performed to achieve accurate water level detection.

In this implementation, before generating the grayscale reference line and the grayscale image curve based on the current grayscale image data, it is determined whether the current grayscale image parameters are all within the preset grayscale range. If the current grayscale image parameters are not all within the preset grayscale range, the exposure time of the fill light lamp is adjusted according to the current grayscale image parameters, which improves the accuracy of water level detection, thereby improving the reliability and safety of the respiratory humidification apparatus.

Further, as for the adjustment method of the exposure time of the fill light lamp, as an example, in a feasible implementation, the above adjustment of the exposure time of the fill light lamp according to the current grayscale image parameters includes:

if the maximum value of the current grayscale image data is less than the lower limit of the preset grayscale range, it is determined whether current exposure time of the fill light lamp reaches the upper limit of the exposure time; if reached, the current exposure time of the fill light lamp is maintained; otherwise, the exposure time of the fill light lamp is increased; and if the minimum value of the current grayscale image data is greater than the upper limit of the preset grayscale range, the exposure time of the fill light lamp is reduced.

It can be understood that the maximum value of the grayscale image data is greater than the minimum value and the average value, and thus when the maximum value of the current grayscale image data is less than the lower limit of the preset grayscale range, it indicates that the current grayscale image parameters are all less than the lower limit of the preset grayscale range; and when the minimum value of the current grayscale image data is greater than the upper limit of the preset grayscale range, it indicates that the current grayscale image parameters are all greater than the upper limit of the preset grayscale range.

In practical applications, in order to ensure the service life of the fill light lamp, the upper limit of the exposure time of the fill light lamp is set, which improves the reliability of water level detection. There is no specific limit on the way of increasing the exposure time of the fill light lamp. For example, an increase mechanism can be set up, with the exposure time increased by a fixed value each time; for another example, the exposure time is determined based on a difference between the maximum value and the lower limit of the grayscale range, the larger the difference, the longer the increased exposure time. There is no limit on the method of reducing the exposure time of the fill light lamp. For example, a reduction mechanism can be set up, with the exposure time reduced by a fixed value each time; for another example, the exposure time is determined based on a difference between the minimum value and the upper limit of the grayscale range, the larger the difference, the longer the reduced exposure time.

In this implementation, the exposure time of the fill light lamp is adjusted according to the current grayscale image parameters, so that the float position image captured by the camera meets the requirements, improving the accuracy of water level detection, and thereby improving the reliability and safety of the respiratory humidification apparatus.

Furthermore, in order to ensure the safety and reliability of the respiratory humidification apparatus, a warning signal can be output when the water level height value of the humidification chamber is small, so that the user can handle it in time. As an example, in a feasible implementation, after the above step 104, the method further includes:

according to the current height value of the float, determining the current water level height value of the humidification chamber, where the height value of the float is the height value of the float relative to the bottom of the humidification chamber; and if the current water level height value of the humidification chamber is less than a warning height value, outputting a warning signal.

Where the warning height value can be set according to actual needs. When the safety requirement is high, the warning height value can be set to a larger value; and when the safety requirement is low, the warning height value can be set to a smaller value. It should be noted that the warning height value is greater than 0 due to the fact that after outputting the warning signal, a certain reaction time is required before it can be processed.

In this embodiment, after determining the current water level height value of the humidification chamber, when the current water level height value of the humidification chamber is less than the warning height value, a warning signal is output, thereby improving the reliability and safety of the respiratory humidification apparatus.

In addition, in one example, after determining the current water level height value of the humidification chamber based on the current height value of the float, if the current water level height value of the humidification chamber is greater than the highest water level value, a warning signal is output.

Specifically, for the respiratory humidification apparatus that is automatically added with water, the highest water level of the humidification chamber is generally set. When the water level of the humidification chamber reaches the highest water level, addition of water is stopped. In practice, the automatic water adding device may be abnormal, and the addition of water is not stopped even when the water level in the humidification chamber reaches the highest water level. It can be understood that the water level detection method provided by the present application can realize the water level detection of the humidification chamber, and when the water level height value of the humidification chamber is greater than the highest water level, a warning signal is output, which improves the reliability and safety of the respiratory humidification apparatus.

In practice, in order to further improve the accuracy of water level detection and thus improve the reliability and safety of the respiratory humidification apparatus, the current grayscale image data can be preprocessed to suppress noise of the grayscale image. As an example, the grayscale image curve may be preprocessed to filter out sharp burrs. In a feasible implementation, before the above step 104, the method further includes:

performing a smoothing processing on the grayscale image curve to obtain the smoothed grayscale image curve;

the above step 104 specifically includes:

determining the height value of the float according to the relative position relationship between the grayscale reference line and the smoothed grayscale image curve.

Where the smoothing processing includes mean filtering, median filtering, gaussian filtering, and the like. In this embodiment, after obtaining the grayscale reference line and the grayscale image curve, the grayscale image curve is smoothed, and according to the relative position relationship between the grayscale reference line and the smoothed grayscale image curve, the height value of the float is determined. This improves the accuracy of water level detection, thereby improving the reliability and safety of the respiratory humidification apparatus.

The water level detection method provided by this embodiment involves obtaining the float position image captured by the current camera; performing a grayscale processing on the float position image to obtain a current grayscale image data, where the current grayscale image data is a grayscale value of each unit height of the humidification chamber in a grayscale image corresponding to the float position image; generating a grayscale reference line and a grayscale image curve based on the current grayscale image data, where the grayscale image curve is a relationship curve between the current grayscale image data and a height value of the humidification chamber; determining a height value of the float according to a relative position relationship between the grayscale reference line and the grayscale image curve. In the embodiment of the present application, the float position image captured by the camera is subjected to a grayscale processing to obtain the current grayscale image data, and a grayscale reference line and the grayscale image curve are generated based on the grayscale image data, and then according to a relative position relationship between the grayscale reference line and the grayscale image curve, the height value of the float can be determined. In practice, the float is located at the upper water level in the humidification chamber, and the height value of the float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus.

In some feasible implementations, the fill light lamp is located above the humidification chamber, the camera is arranged at a side of the humidification chamber, and when the light is low or the fill light lamp is turned on, there will be a shadow between the float and the bottom of the humidification chamber. In theory, a longitudinal width of the shadow is larger than that of the float.

In some implementations, the Step 307 includes: if the third number of segment is 2, regarding a section between first and second intersection points of the third sub-grayscale reference line and the grayscale image curve as a first segment, an absolute value of a difference between abscissa values corresponding to the first and second intersection points being a width of the first segment, and regarding a section between third and fourth intersection points of the third sub-grayscale reference line and the grayscale image curve as a second segment, an absolute value of a difference between abscissa values corresponding to the third and fourth intersection points being a width of the second segment;

if the first segment contains the minimum value of grayscale for the entire grayscale image curve, and the width of the first segment is less than the width of the second segment, using a height value of the humidification chamber corresponding to the first intersection point of the grayscale image curve and the third sub-grayscale reference line as the height value of the float;

if the second segment contains the minimum value of grayscale for the entire grayscale image curve, and the width of the second segment is less than the width of the first segment, using a height value of the humidification chamber corresponding to the third intersection point of the grayscale image curve and the third sub-grayscale reference line as the height value of the float; and in other cases, using the height value of the humidification chamber corresponding to the first intersection point of the grayscale image curve and the third sub-grayscale reference line as the height value of the float.

Figure 9:
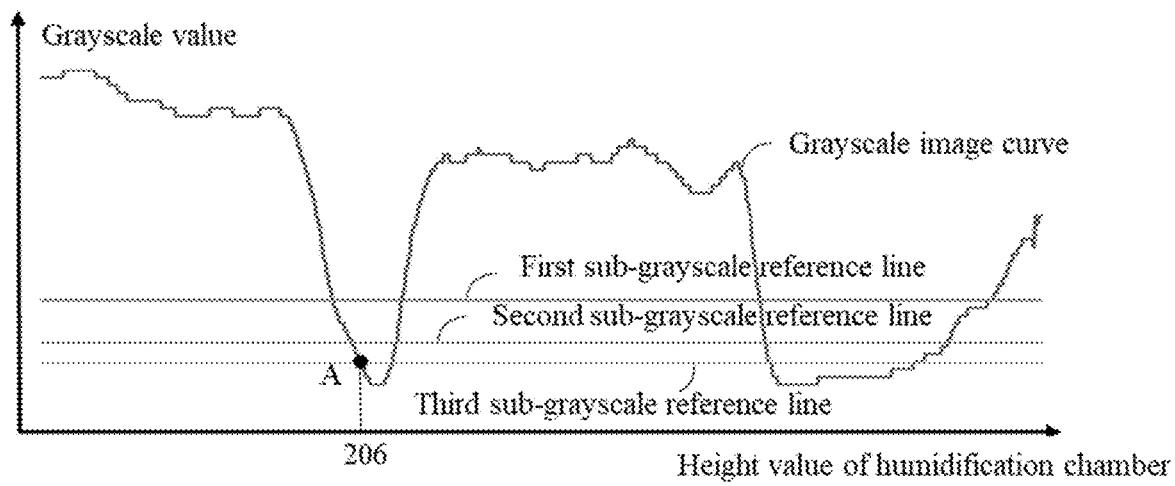
FIGS. 9 and 10 are schematic diagrams of determining a height value of a float provided in an embodiment of the present application.
Figure 10:
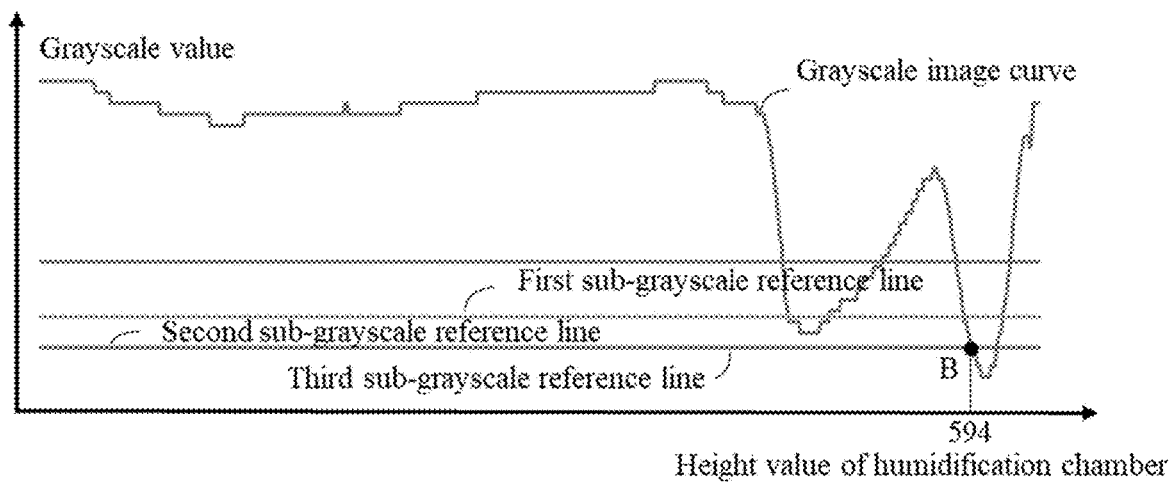

Specifically, a specific process of determining the height value of the float from the height value of the humidification chamber corresponding to each intersection point based on the first number of segment, the second number of segment and the third number of segment is exemplarily illustrated in combination with FIGS. 9 and 10.

In FIG. 9, the first number of segment C1, the second number of segment C2 and the third number of segment C3 are all 2, two segments below the third sub-grayscale reference line both contain the minimum value 8 of grayscale for the entire grayscale image curve, and the width of the first segment is less than the width of the second segment, the height value of the humidification chamber corresponding to first intersection point A of the grayscale image curve and the third sub-grayscale reference line is used as the height value of the float, and as shown in FIG. 9, the height value of the humidification chamber corresponding to the point A is 206, then the height value of the float is 206, and the water level height value of the humidification chamber is 206.

In FIG. 10, the first number of segment C1 and the second number of segment C2 are both 2, the third number of segment C3 is 1, the height value of the humidification chamber corresponding to first intersection point B of the grayscale image curve and the third sub-grayscale reference line is used as the height value of the float, and as shown in FIG. 10, the height value of the humidification chamber corresponding to the point B is 594, then the height value of the float is 594, and the water level height value of the humidification chamber is 594.

Embodiment 2

Figure 7:
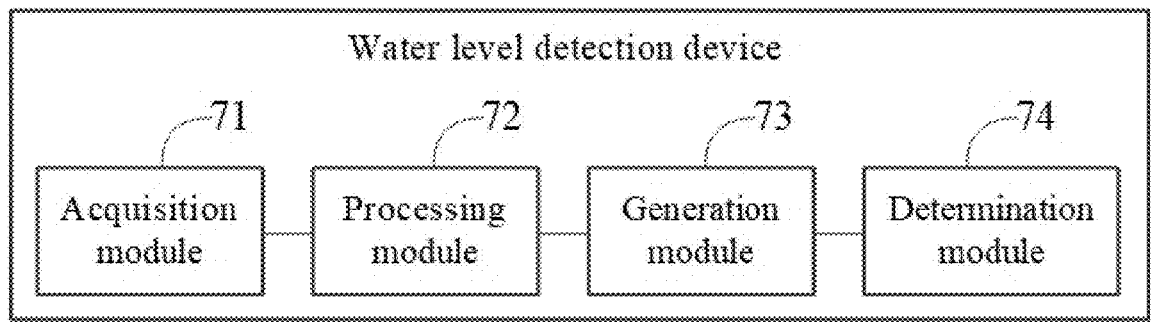
FIG. 7 is a schematic structural diagram of a water level detection device provided in Embodiment 2 of the present application.

FIG. 7 is a schematic structural diagram of a water level detection device provided in Embodiment 2 of the present application, which is applied to a respiratory humidification apparatus. The respiratory humidification apparatus includes a humidification chamber, and the humidification chamber includes a float. As shown in FIG. 7, the device includes:

an acquisition module 71, configured to acquire a float position image captured by a current camera;

a processing module 72, configured to perform a grayscale processing on the float position image to obtain a current grayscale image data, where the current grayscale image data is a grayscale value of each unit height of the humidification chamber in a grayscale image corresponding to the float position image;

a generation module 73, configured to generate a grayscale reference line and a grayscale image curve based on the current grayscale image data, where the grayscale image curve is a relationship curve between the current grayscale image data and a height value of the humidification chamber; and a determination module 74, configured to determine a height value of the float according to a relative position relationship between the grayscale reference line and the grayscale image curve.

Specifically, the acquisition module 71 acquires the float position image captured by the current camera. For example, the camera captures the float position image in real time, and the acquisition module 71 acquires the float position image captured by the current camera in real time. For another example, the camera can periodically capture the float position image. The acquisition module 71 can set the shooting period according to actual needs. The water level detection device controls the camera to capture the position image of the float when the shooting time comes. The acquisition module 71 obtains the float position image captured by the current camera.

In an implementation, for a respiratory humidification apparatus that is manually added with water, in order to save the cost of water level detection, when the water level in the humidification chamber is high, water level detection is not performed or a large shooting period is set. Exemplarily, after adding water to the humidification chamber, the water level detection device sets a start time of water level detection according to a current power of the respiratory humidification apparatus. For example, when the power of the respiratory humidification apparatus is large, the start time of water level detection is set to be earlier; and when the power of the respiratory humidification apparatus is small, the start time of water level detection is set to be later.

In this embodiment, the grayscale processing refers to a process of converting the float position image into a corresponding grayscale image. A grayscale image occupies less memory than the position image of the float and can increase the speed of water level detection. After the processing module 72 converts the position image of float into a corresponding grayscale image, the grayscale image can increase visual contrast, highlight a target area, and determine the position of the float more accurately and quickly.

Further, after the processing module 72 converts the float position image into the corresponding grayscale image, each pixel includes one grayscale value. In this embodiment, unit height of the humidification chamber includes at least one row of pixels. The unit height of the humidification chamber can be set according to actual needs. The grayscale values of all pixels under the unit height of the humidification chamber are close to each other. The processing module 72 can use an average grayscale value of all pixels under unit height of the humidification chamber as the grayscale value of the unit height of the humidification chamber.

Specifically, the grayscale reference line is generated based on the grayscale image data, and the grayscale reference line is used as a standard for determining the size of the grayscale values on the grayscale image curve. In practice, the water in the humidification chamber is colorless, and the grayscale value of the float in the grayscale image is greater than the grayscale values of other positions in the grayscale image. Therefore, the grayscale value of a part of the grayscale image curve located below the grayscale reference line is a corresponding grayscale value of a part where the float is located in the float position image.

Further, the determination module 74 is used to determine the height value of the float according to the relative position relationship between the grayscale reference line and the grayscale image curve. Specifically, a rectangular coordinate system is established, the abscissa is the height value of the humidification chamber, the ordinate is the grayscale value, and a part of the grayscale image curve located below the grayscale reference line is obtained. Both ends of the part of the grayscale image curve intersect with the grayscale reference line, and the height value of the humidification chamber corresponding to the first intersection point is used as the height value of the float. It can be understood that, based on the current grayscale image data, a grayscale reference line and a grayscale image curve are generated, and based on the relative position between the grayscale reference line and the grayscale image curve, the height value of the float can be obtained quickly.

In this embodiment, the processing module 72 performs grayscale processing on the float position image captured by the camera to obtain the current grayscale image data. The generation module 73 generates a grayscale reference line and a grayscale image curve based on the grayscale image data, and determination module 74 can determine the height value of the float according to the relative position relationship between the grayscale reference line and the grayscale image curve. In practice, the float is located at the upper water level in the humidification chamber, and the height value of the float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus.

Based on the above embodiments, in a feasible implementation, the device further includes:
an extraction module, configured to determine current grayscale image parameters according to the current grayscale image data, where the current grayscale image parameters include a minimum value and an average value of the grayscale image data;
the above-mentioned grayscale reference line includes a first sub-grayscale reference line, a second sub-grayscale reference line and a third sub-grayscale reference line; the above-mentioned generation module 73 includes:
a selection unit, configured to select a first threshold, a second threshold and a third threshold from a numerical interval corresponding to the minimum value and the average value of the current grayscale image data;
a generation unit, configured to generate the first sub-grayscale reference line, the second sub-grayscale reference line and the third sub-grayscale reference line by respectively using the first threshold, the second threshold and the third threshold as a segmentation reference;
the above-mentioned determination module 74 includes:
a segmentation processing unit, configured to perform a segmentation processing on the grayscale image curve by respectively using the first sub-grayscale reference line, the second sub-grayscale reference line, and the third sub-grayscale reference line as a segmentation reference line, to obtain a first number of segment, a second number of segment and a third number of segment, where the segmentation processing includes: under each segmentation reference, dividing the grayscale image curve by the segmentation reference line, and counting number of segment located below the segmentation reference line;
a recording unit, configured to determine an intersection point of each of the first sub-grayscale reference line, the second sub-grayscale reference line and the third sub-grayscale reference line with the grayscale image curve, and record the height value of the humidification chamber corresponding to each intersection point; and
a determination unit, configured to determine the height value of the float from the height value of the humidification chamber corresponding to each intersection point according to the first number of segment, the second number of segment, and the third number of segment.

It can be understood that the extraction module determines the minimum value and the average value of the current grayscale image data according to the current grayscale image data. Where the minimum value of the current grayscale image data can be obtained through direct search. The average value of the current grayscale image data can be calculated.

Combined with the above description, the current grayscale image data is a grayscale value of each unit height of the humidification chamber in a grayscale image corresponding to the float position image. Specifically, when the generation module 73 generates the grayscale image curve based on the current grayscale image data, it is specifically configured to: use the height value of the humidification chamber as abscissa and the grayscale value as ordinate to establish a rectangular coordinate system, and fit the current grayscale image data to generate the grayscale image curve.

Specifically, the first threshold, the second threshold and the third threshold are selected, by the selection unit, from the numerical interval corresponding to the minimum value and the average value of the current grayscale image data. In practice, the first threshold, the second threshold, and the third threshold may be any three values selected from the above numerical interval, or may be selected according to a pre-specified rule. This is not specifically limited here. In one example, the selection unit is configured to:

calculating an average value of the average value of the current grayscale image data and the minimum value of the current grayscale image data to obtain the first threshold;

calculating an average value of the minimum value of the current grayscale image data and the first threshold to obtain the second threshold; and calculating an average value of the minimum value of the current grayscale image data and the second threshold to obtain the third threshold.

In this embodiment, in order to more accurately detect the water level of the humidification chamber, three sub-grayscale reference lines are set, and the height value of the float is determined according to the relative position relationship between the grayscale image curve and the multiple sub-grayscale reference lines. In the rectangular coordinate system with the height value of the humidification chamber as the abscissa and the grayscale value as the ordinate, the three sub-grayscale reference lines are three straight lines parallel to the abscissa axis. The ordinate values corresponding to the three sub-grayscale reference lines are the first threshold, the second threshold and the third threshold, respectively. Specifically, the generation unit is specifically configured to: generate the first sub-grayscale reference line, the second sub-grayscale reference line and the third sub-grayscale reference line, ordinates of which are the first threshold, the second threshold and the third threshold, respectively, and which are parallel to the abscissa axis.

It should be noted that the number of sub-grayscale reference lines can be set according to actual needs and the current grayscale image data. In this implementation, setting three sub-grayscale reference lines is only an example. The number of sub-grayscale reference lines is not specifically limited.

Specifically, the segmentation processing unit performs a segmentation processing on the grayscale image curve by respectively using the first sub-grayscale reference line, the second sub-grayscale reference line, and the third sub-grayscale reference line as a segmentation reference line, to obtain the first number of segment, the second number of segment, and the third number of segment. It can be understood that the first number of segment C1 is obtained by performing the segmentation processing on the grayscale image curve using the first sub-grayscale reference line as the segmentation reference line, and counting number of segment below the first sub-grayscale reference line; similarly, the second number of segment C2 is obtained by performing the segmentation processing on the grayscale image curve using the second sub-grayscale reference line as the segmentation reference line, and counting number of segment below the second sub-grayscale reference line; and the third number of segment C3 is obtained by performing the segmentation processing on the grayscale image curve using the third sub-grayscale reference line as the segmentation reference line, and counting number of segment below the third sub-grayscale reference line.

In practical applications, the first sub-grayscale reference line, the second sub-grayscale reference line and the third sub-grayscale reference line are all used to determine the height value of the float. It can be understood that there are multiple intersection points of the first sub-grayscale reference line, the second sub-grayscale reference line and the third sub-grayscale reference line with the grayscale image curve, and each intersection point corresponds to one height value of the humidification chamber, and the height value of the float is included in the height values of the humidification chamber corresponding to the multiple intersection points. Therefore, after determining the intersection point of each of the first sub-grayscale reference line, the second sub-grayscale reference line, and the third sub-grayscale reference line with the grayscale image curve, the recording unit records the height value of the humidification chamber corresponding to each intersection point.

Furthermore, the height value of the float needs to be determined from the height values of the humidification chamber corresponding to the multiple intersection points. Specifically, the determination unit determines the height value of the float from the height value of the humidification chamber corresponding to each intersection point according to the first number of segment, the second number of segment, and the third number of segment.

As an example, the above determination unit is specifically configured to: if the first number of segment, the second number of segment and the third number of segment are all 1, use the height value of the humidification chamber corresponding to first intersection point of the grayscale image curve and the first sub-grayscale reference line as the height value of the float; otherwise, use the height value of the humidification chamber corresponding to first intersection point of the grayscale image curve and the second sub-grayscale reference line as the height value of the float.

In this embodiment, first, the processing module 72 performs a grayscale processing on the float position image captured by the camera to obtain the current grayscale image data; then, the extraction module determines the current grayscale image parameters based on the current grayscale image data; then, the generation module 73 generates the grayscale image curve according to the current grayscale image data, and generates the first sub-grayscale reference curve, the second sub-grayscale reference line and the third sub-grayscale reference line according to the grayscale image parameters; finally, the determination module 74 determines the height value of the float according to the relative position relationship between the first sub-grayscale reference curve, the second sub-grayscale reference line, and the third sub-grayscale reference line with the grayscale image curve. In practice, the float is located at the upper water level in the humidification chamber, and the height value of the float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus. Furthermore, in this embodiment, three sub-grayscale reference lines are set, which can more accurately detect the water level of the humidification chamber and improve the accuracy of water level detection.

As an example, in a feasible implementation, the current grayscale image parameters also include a maximum value of the current grayscale image data; the device further includes:

a judgment module configured to determine whether the current grayscale image parameters are all within a preset grayscale range;

an adjustment module configured to, if the current grayscale image parameters are not all within the preset grayscale range, adjust exposure time of a fill light lamp according to the current grayscale image parameters, and return to perform the step of obtaining the float position image captured by the current camera;

generation module 73 is specifically configured to:
if the current grayscale image parameters are all within the preset grayscale range, generate the grayscale reference line and the grayscale image curve based on the current grayscale image data.

Where the grayscale range can be preset according to actual water level detection needs. It can be understood that if the current grayscale image parameters are all within the preset grayscale range, it indicates that the current float position image meets the needs of water level detection. Specifically, the generation module 73 generates the grayscale reference line and the grayscale image curve based on the current grayscale image data. The determination module 74 determines the height value of the float according to the relative position relationship between the grayscale reference line and the grayscale image curve.

Correspondingly, if the current grayscale image parameters are not all within the preset grayscale range, it indicates that the current float position image meets the needs of water level detection. Specifically, the fill light lamp is turned on, the exposure time of the fill light lamp is adjusted according to the current grayscale image parameters, and the float position image is re-captured by the camera until the current float position image meets the requirements for water level detection, and then, based on the float position image re-captured by the camera, subsequent water level detection steps are performed to achieve accurate water level detection.

In this implementation, before generating the grayscale reference line and the grayscale image curve based on the current grayscale image data, it is determined whether the current grayscale image parameters are all within the preset grayscale range. If the current grayscale image parameters are not all within the preset grayscale range, the exposure time of the fill light lamp is adjusted according to the current grayscale image parameters, which improves the accuracy of water level detection, thereby improving the reliability and safety of the respiratory humidification apparatus.

Further, as for the adjustment method of the exposure time of the fill light lamp, as an example, in a feasible implementation, the above adjustment module is specifically configured to:
if the maximum value of the current grayscale image data is less than the lower limit of the preset grayscale range, it is determined whether current exposure time of the fill light lamp reaches the upper limit of the exposure time; if reached, the current exposure time of the fill light lamp is maintained; otherwise, the exposure time of the fill light lamp is increased; and
if the minimum value of the current grayscale image data is greater than an upper limit of the preset grayscale range, the exposure time of the fill light lamp is reduced.

It can be understood that the maximum value of the grayscale image data is greater than the minimum value and the average value, and thus when the maximum value of the current grayscale image data is less than the lower limit of the preset grayscale range, it indicates that the current grayscale image parameters are all less than the lower limit of the preset grayscale range; and when the minimum value of the current grayscale image data is greater than the upper limit of the preset grayscale range, it indicates that the current grayscale image parameters are all greater than the upper limit of the preset grayscale range.

In practical applications, in order to ensure the service life of the fill light lamp, the upper limit of the exposure time of the fill light lamp is set, which improves the reliability of water level detection. There is no specific limit on the way of increasing the exposure time of the fill light lamp. For example, an increase mechanism can be set up, with the exposure time increased by a fixed value each time; for another example, the exposure time is determined based on a difference between the maximum value and the lower limit of the grayscale range, the larger the difference, the longer the increased exposure time. There is no limit on the method of reducing the exposure time of the fill light lamp. For example, a reduction mechanism can be set up, with the exposure time reduced by a fixed value each time; for another example, the exposure time is determined based on a difference between the minimum value and the upper limit of the grayscale range, the larger the difference, the longer the reduced exposure time.

In this implementation, the exposure time of the fill light lamp is adjusted according to the current grayscale image parameters, so that the float position image captured by the camera meets the requirements, improving the accuracy of water level detection, and thereby improving the reliability and safety of the respiratory humidification apparatus.

Furthermore, in order to ensure the safety and reliability of the respiratory humidification apparatus, a warning signal can be output when the water level height value of the humidification chamber is small, so that the user can handle it in time. As an example, in a feasible implementation, the device further includes: a warning module, configured to:
according to the current height value of the float, determine the current water level height value of the humidification chamber, where the height value of the float is the height value of the float relative to bottom of the humidification chamber; and
if the current water level height value of the humidification chamber is less than a warning height value, output a warning signal.

Where the warning height value can be set according to actual needs. When the safety requirement is high, the warning height value can be set to a larger value; and when the safety requirement is low, the warning height value can be set to a smaller value. It should be noted that the warning height value is greater than 0 due to the fact that after outputting the warning signal, a certain reaction time is required before it can be processed.

In this embodiment, after determining the current water level height value of the humidification chamber, when the current water level height value of the humidification chamber is less than the warning height value, a warning signal is output, thereby improving the reliability and safety of the respiratory humidification apparatus.

In addition, in one example, the warning module is further configured to output a warning signal if the current water level height value of the humidification chamber is greater than the highest water level value.

Specifically, for the respiratory humidification apparatus that is automatically added with water, a highest water level of the humidification chamber is generally set. When the water level of the humidification chamber reaches the highest water level, addition of water is stopped. In practice, the automatic water adding device may be abnormal, and the addition of water is not stopped even when the water level in the humidification chamber reaches the highest water level. It can be understood that the water level detection method provided by the present application can realize the water level detection of the humidification chamber, and when the water level height value of the humidification chamber is greater than the highest water level, a warning signal is output, which improves the reliability and safety of the respiratory humidification apparatus.

In a feasible implementation, the device further includes: a preprocessing module, configured to:
  perform a smoothing processing on the grayscale image curve to obtain a smoothed grayscale image curve;
  determining the height value of the float according to the relative position relationship between the grayscale reference line and the grayscale image curve specifically includes:
  determining the height value of the float according to a relative position relationship between the grayscale reference line and the smoothed grayscale image curve.

Where the smoothing processing includes mean filtering, median filtering, gaussian filtering, and the like. In this embodiment, after obtaining the grayscale reference line and the grayscale image curve, the grayscale image curve is smoothed, and according to the relative position relationship between the grayscale reference line and the smoothed grayscale image curve, the height value of the float is determined. This improves the accuracy of water level detection, thereby improving the reliability and safety of the respiratory humidification apparatus.

The water level detection device provided in this embodiment includes an acquisition module configured to acquire a float position image captured by a current camera; a processing module configured to perform a grayscale processing on the float position image to obtain a current grayscale image data, where the current grayscale image data is a grayscale value of each unit height of the humidification chamber in a grayscale image corresponding to the float position image; a generation module configured to generate a grayscale reference line and a grayscale image curve based on the current grayscale image data, where the grayscale image curve is a relationship curve between the current grayscale image data and a height value of the humidification chamber; and a determination module configured to determine a height value of the float according to a relative position relationship between the grayscale reference line and the grayscale image curve. In the embodiment of the present application, the float position image captured by the camera is subjected to grayscale processing to obtain the current grayscale image data, and a grayscale reference line and grayscale image curve are generated based on the grayscale image data, and then according to a relative position relationship between the grayscale reference line and the grayscale image curve, the height value of the float can be determined. In practice, the float is located at the upper water level in the humidification chamber, and the height value of the float is the water level height value of the humidification chamber. Therefore, the solution of the present application can, based on image processing technology, avoid the influence of environmental factors and can timely and accurately detect the water level of the humidification chamber without indirect deduction process, improving the reliability and safety of the respiratory humidification apparatus Embodiment 3

Figure 8:
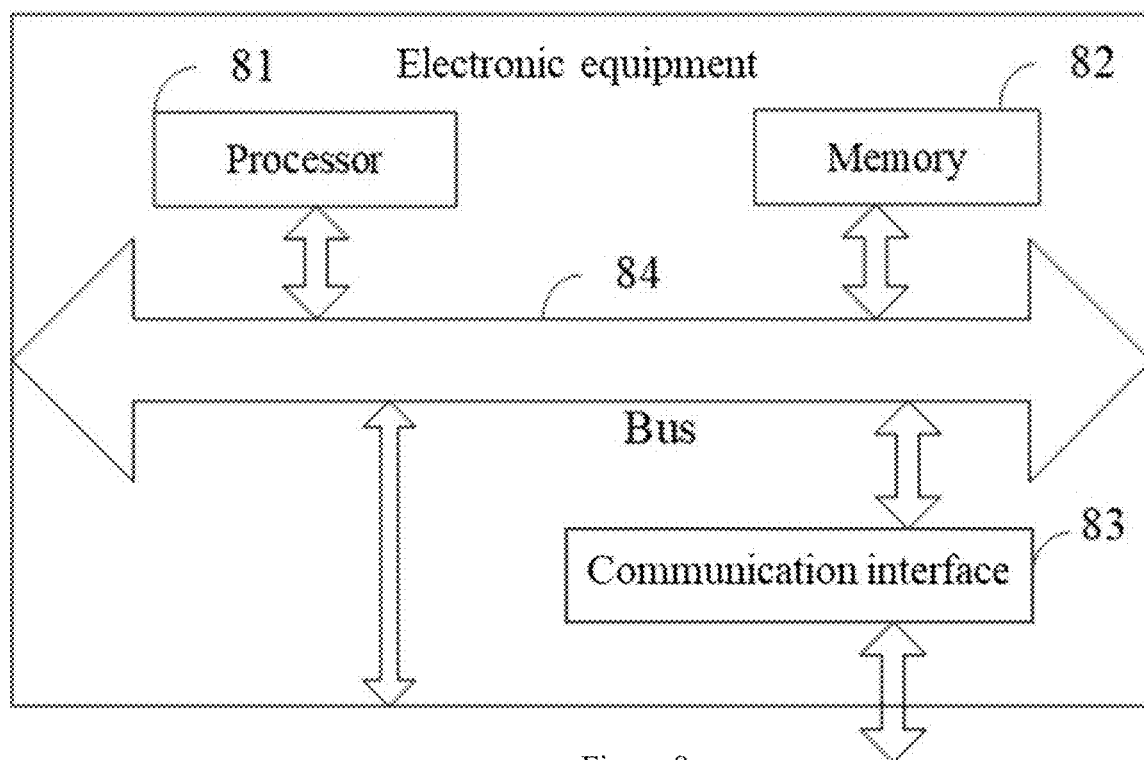
FIG. 8 is a schematic structural diagram of electronic equipment provided in Embodiment 3 of the present application.

FIG. 8 is a schematic structural diagram of electronic equipment provided in Embodiment 3 of the present application. As shown in FIG. 8, the electronic equipment includes:
  a processor 81; a memory 82 included in a main control device; and also a communication interface 83 and a bus 84, where the processor 81, the memory 82, and the communication interface 83 can communicate with each other through the bus 84, the communication interface 83 can be used for information transmission, the processor 81 can call logical instructions in the memory 82 to execute the methods of the above embodiments.

In addition, the above logical instructions in the memory 82 may be implemented in form of functional units of software and may be stored in a computer-readable storage medium when sold or used as an independent product.

As a computer-readable storage medium, the memory 82 can be used to store software programs and computer executable programs, such as program instructions/modules corresponding to the methods in the embodiments of the present application. The processor 81 executes the software programs, instructions and modules stored in the memory 82 to execute functional applications and data processing, that is, to implement the methods in the above method embodiments.

The memory 82 may include a program storage area and a data storage area, where the program storage area may store an operating system and an application program required for at least one function; the data storage area may store data created according to use of a terminal device, etc. In addition, the memory 82 may include high-speed random access memory, and may also include non-volatile memory.

An embodiment of the present application also provides a computer-readable storage medium, the computer-readable storage medium stores computer executable instructions that, when executed by a processor, implement the method in any one of the embodiments. For example, the above-mentioned computer-readable storage medium may be ROM, random access memory (RAM), CD-ROM, magnetic tape, floppy disk, optical data storage device, etc.

In an exemplary embodiment, a computer program product is further provided, including a computer program that, when executed by a processor, implements the above methods.

An embodiment of the present application further provides a warning system, including the above water level detection method and the above water level detection device.

Other embodiments of the present application will be apparent to those skilled in the art from consideration of the description and practice of the solutions disclosed herein. The present application intends to cover any variations, uses, or adaptations of the present application, and these variations, uses, or adaptations follow the general principles of the present application and include common knowledge or customary technical means in the technical field that are not disclosed in the present application. The description and the embodiments are considered as exemplary only, with a true scope and spirit of the present application being indicated by the following claims.

It should be understood that the present application is not limited to the precise structures described above and illustrated in the accompanying drawings, and that various modifications and changes may be made without departing from the scope of the present application. The scope of the present application is limited only by the appended claims.

What is claimed is:
1. A water level detection method, applied to respiratory humidification apparatus, the respiratory humidification apparatus comprising a humidification chamber and the humidification chamber comprising a float, the method comprising:
  obtaining a float position image captured by a current camera;
  performing a grayscale processing on the float position image to obtain a current grayscale image data, wherein the current grayscale image data is a grayscale value of each unit height of the humidification chamber in a grayscale image corresponding to the float position image;
  generating a grayscale reference line and a grayscale image curve based on the current grayscale image data, wherein the grayscale image curve is a relationship curve between the current grayscale image data and a height value of the humidification chamber, the grayscale reference line comprises a first sub-grayscale reference line, a second sub-grayscale reference line and a third sub-grayscale reference line;
  performing a segmentation processing on the grayscale image curve by respectively using the first sub-grayscale reference line, the second sub-grayscale reference line, and the third sub-grayscale reference line as a segmentation reference line, to obtain a first number of segment, a second number of segment, and a third number of segment, wherein the segmentation processing comprises: under each segmentation reference, dividing the grayscale image curve by the segmentation reference line, and counting number of segment located below the segmentation reference line;
  determining an intersection point of each of the first sub-grayscale reference line, the second sub-grayscale reference line and the third sub-grayscale reference line with the grayscale image curve, and recording the height value of the humidification chamber corresponding to each intersection point; and
  determining a height value of the float from the height value of the humidification chamber corresponding to each intersection point according to the first number of segment, the second number of segment, and the third number of segment;
  before generating the grayscale reference line and the grayscale image curve based on the current grayscale image data, the method further comprises:
  determining current grayscale image parameters based on the current grayscale image data, the current grayscale image parameters comprise a minimum value and an average value of the current grayscale image data;
  the generating the grayscale reference line based on the current grayscale image data comprises:
  selecting a first threshold value, a second threshold value, and a third threshold value from a numerical interval corresponding to the minimum value and the average value of the current grayscale image data; and
  generating the first sub-grayscale reference line, the second sub-grayscale reference line and the third sub-grayscale reference line by respectively using the first threshold value, the second threshold value and the third threshold value as a segmentation reference.

2. The method according to claim 1, wherein the determining the height value of the float from the height value of the humidification chamber corresponding to each intersection point according to the first number of segment, the second number of segment, and the third number of segment comprises: if the first number of segment, the second number of segment and the third number of segment are all 1, using the height value of the humidification chamber corresponding to first intersection point between the grayscale image curve and the first sub-grayscale reference line as the height value of the float; otherwise, using the height value of the humidification chamber corresponding to first intersection point between the grayscale image curve and the second sub-grayscale reference line as the height value of the float.

3. The method according to claim 2, wherein after determining the height value of the float according to the relative position relationship between the grayscale reference line and the grayscale image curve, the method further comprises:
  determining a current water level height value of the humidification chamber according to a current height value of the float, wherein the height value of the float is a height value of the float relative to bottom of the humidification chamber; and
  if the current water level height value of the humidification chamber is less than a warning height value, outputting a warning signal.

4. The method according to claim 2, wherein before determining the height value of the float according to the relative position relationship between the grayscale reference line and the grayscale image curve, the method further comprises:
  performing a smoothing processing on the grayscale image curve to obtain a smoothed grayscale image curve;
  the determining the height value of the float according to the relative position relationship between the grayscale reference line and the grayscale image curve specifically comprises:
  determining the height value of the float according to a relative position relationship between the grayscale reference line and the smoothed grayscale image curve.

5. The method according to claim 1, wherein the selecting the first threshold, the second threshold and the third threshold from the numerical interval corresponding to the minimum value and the average value of the current grayscale image data comprises:
  calculating an average value of the average value of the current grayscale image data and the minimum value of the current grayscale image data to obtain the first threshold;
  calculating an average value of the minimum value of the current grayscale image data and the first threshold to obtain the second threshold; and
  calculating an average value of the minimum value of the current grayscale image data and the second threshold to obtain the third threshold.

6. The method according to claim 5, wherein after determining the height value of the float according to the relative position relationship between the grayscale reference line and the grayscale image curve, the method further comprises:
  determining a current water level height value of the humidification chamber according to a current height value of the float, wherein the height value of the float is a height value of the float relative to bottom of the humidification chamber; and
  if the current water level height value of the humidification chamber is less than a warning height value, outputting a warning signal.

7. The method according to claim 5, wherein before determining the height value of the float according to the relative position relationship between the grayscale reference line and the grayscale image curve, the method further comprises:

performing a smoothing processing on the grayscale image curve to obtain a smoothed grayscale image curve;

the determining the height value of the float according to the relative position relationship between the grayscale reference line and the grayscale image curve specifically comprises:

determining the height value of the float according to a relative position relationship between the grayscale reference line and the smoothed grayscale image curve.

8. The method according to claim 1, wherein the current grayscale image parameters further comprise a maximum value of the current grayscale image data; and before generating the grayscale reference line and the grayscale image curve based on the current grayscale image data, the method further comprises:

determining whether the current grayscale image parameters are all within a preset grayscale range;

if the current grayscale image parameters are not all within the preset grayscale range, adjusting exposure time of a fill light lamp according to the current grayscale image parameters, and returning to perform the step of obtaining the float position image captured by the current camera;

the generating the grayscale reference line and the grayscale image curve based on the current grayscale image data specifically comprises:

if the current grayscale image parameters are all within the preset grayscale range, generating the grayscale reference line and the grayscale image curve based on the current grayscale image data.

9. The method according to claim 8, wherein the adjusting the exposure time of the fill light lamp according to the current grayscale image parameters comprises:

if the maximum value of the current grayscale image data is less than a lower limit of the preset grayscale range, determining whether current exposure time of the fill light lamp reaches an upper limit of the exposure time, and if reached, maintaining the current exposure time of the fill light lamp, and otherwise, increasing the exposure time of the fill light lamp; and if the minimum value of the current grayscale image data is greater than an upper limit of the preset grayscale range, reducing the exposure time of the fill light lamp.

10. The method according to claim 9, wherein after determining the height value of the float according to the relative position relationship between the grayscale reference line and the grayscale image curve, the method further comprises:

determining a current water level height value of the humidification chamber according to a current height value of the float, wherein the height value of the float is a height value of the float relative to bottom of the humidification chamber; and if the current water level height value of the humidification chamber is less than a warning height value, outputting a warning signal.

11. The method according to claim 9, wherein before determining the height value of the float according to the relative position relationship between the grayscale reference line and the grayscale image curve, the method further comprises:

performing a smoothing processing on the grayscale image curve to obtain a smoothed grayscale image curve;

the determining the height value of the float according to the relative position relationship between the grayscale reference line and the grayscale image curve specifically comprises:

determining the height value of the float according to a relative position relationship between the grayscale reference line and the smoothed grayscale image curve.

12. The method according to claim 8, wherein before determining the height value of the float according to the relative position relationship between the grayscale reference line and the grayscale image curve, the method further comprises:

performing a smoothing processing on the grayscale image curve to obtain a smoothed grayscale image curve;

the determining the height value of the float according to the relative position relationship between the grayscale reference line and the grayscale image curve specifically comprises:

determining the height value of the float according to a relative position relationship between the grayscale reference line and the smoothed grayscale image curve.

13. The method according to claim 8, wherein after determining the height value of the float according to the relative position relationship between the grayscale reference line and the grayscale image curve, the method further comprises:

determining a current water level height value of the humidification chamber according to a current height value of the float, wherein the height value of the float is a height value of the float relative to bottom of the humidification chamber; and if the current water level height value of the humidification chamber is less than a warning height value, outputting a warning signal.

14. The method according to claim 1, wherein after determining the height value of the float according to the relative position relationship between the grayscale reference line and the grayscale image curve, the method further comprises:

determining a current water level height value of the humidification chamber according to a current height value of the float, wherein the height value of the float is a height value of the float relative to bottom of the humidification chamber; and if the current water level height value of the humidification chamber is less than a warning height value, outputting a warning signal.

15. The method according to claim 1, wherein before determining the height value of the float according to the relative position relationship between the grayscale reference line and the grayscale image curve, the method further comprises:

performing a smoothing processing on the grayscale image curve to obtain a smoothed grayscale image curve;

the determining the height value of the float according to the relative position relationship between the grayscale reference line and the grayscale image curve specifically comprises:

determining the height value of the float according to a relative position relationship between the grayscale reference line and the smoothed grayscale image curve.

16. Electronic equipment, comprising: a processor, and a memory communicatively connected to the processor, wherein the memory stores computer executable instructions; and the processor executes the computer executable instructions stored in the memory to implement the method according to claim 1.

17. The electronic equipment according to claim 16, wherein the determining the height value of the float from the height value of the humidification chamber corresponding to each intersection point according to the first number of segment, the second number of segment, and the third number of segment comprises: if the first number of segment, the second number of segment and the third number of segment are all 1, using the height value of the humidification chamber corresponding to first intersection point between the grayscale image curve and the first sub-grayscale reference line as the height value of the float; otherwise, using the height value of the humidification chamber corresponding to first intersection point between the grayscale image curve and the second sub-grayscale reference line as the height value of the float.

18. A non-transitory computer-readable storage medium, wherein the computer-readable storage medium stores computer executable instructions that, when executed by a processor, implement the method according to claim 1.

19. A water level detection device, applied to a respiratory humidification apparatus, the respiratory humidification apparatus comprising a humidification chamber and the humidification chamber comprising a float, the device comprising:
an acquisition module, configured to acquire a float position image captured by a current camera;
a processing module, configured to perform a grayscale processing on the float position image to obtain a current grayscale image data, wherein the current grayscale image data is a grayscale value of each unit height of the humidification chamber in a grayscale image corresponding to the float position image;
a generation module, configured to generate a grayscale reference line and a grayscale image curve based on the current grayscale image data, wherein the grayscale image curve is a relationship curve between the current grayscale image data and a height value of the humidification chamber, and the grayscale reference line comprises a first sub-grayscale reference line, a second sub-grayscale reference line and a third sub-grayscale reference line; and
a determination module, configured to perform a segmentation processing on the grayscale image curve by respectively using the first sub-grayscale reference line, the second sub-grayscale reference line, and the third sub-grayscale reference line as a segmentation reference line, to obtain a first number of segment, a second number of segment and a third number of segment, wherein the segmentation processing comprises: under each segmentation reference, dividing the grayscale image curve by the segmentation reference line, and counting number of segment located below the segmentation reference line; to determine an intersection point of each of the first sub-grayscale reference line, the second sub-grayscale reference line and the third sub-grayscale reference line with the grayscale image curve, and record the height value of the humidification chamber corresponding to each intersection point; and to determine a height value of the float from the height value of the humidification chamber corresponding to each intersection point according to the first number of segment, the second number of segment, and the third number of segment;
the device further comprises:
an extraction module, configured to determine current grayscale image parameters according to the current grayscale image data, wherein the current grayscale image parameters comprise a minimum value and an average value of the current grayscale image data;
the generation module comprises:
a selection unit, configured to select a first threshold, a second threshold and a third threshold from a numerical interval corresponding to the minimum value and the average value of the current grayscale image data; and
a generation unit, configured to generate the first sub-grayscale reference line, the second sub-grayscale reference line and the third sub-grayscale reference line by respectively using the first threshold, the second threshold and the third threshold as a segmentation reference.

20. A warning system, comprising a water level detection method and the water level detection device according to claim 19, wherein
the water level detection method is applied to respiratory humidification apparatus, the respiratory humidification apparatus comprises a humidification chamber and the humidification chamber comprises a float, the method comprises:
obtaining a float position image captured by a current camera;
performing a grayscale processing on the float position image to obtain a current grayscale image data, wherein the current grayscale image data is a grayscale value of each unit height of the humidification chamber in a grayscale image corresponding to the float position image;
generating a grayscale reference line and a grayscale image curve based on the current grayscale image data, wherein the grayscale image curve is a relationship curve between the current grayscale image data and a height value of the humidification chamber, the grayscale reference line comprises a first sub-grayscale reference line, a second sub-grayscale reference line and a third sub-grayscale reference line;
performing a segmentation processing on the grayscale image curve by respectively using the first sub-grayscale reference line, the second sub-grayscale reference line, and the third sub-grayscale reference line as a segmentation reference line, to obtain a first number of segment, a second number of segment, and a third number of segment, wherein the segmentation processing comprises: under each segmentation reference, dividing the grayscale image curve by the segmentation reference line, and counting number of segment located below the segmentation reference line;
determining an intersection point of each of the first sub-grayscale reference line, the second sub-grayscale reference line and the third sub-grayscale reference line with the grayscale image curve, and recording the height value of the humidification chamber corresponding to each intersection point; and
determining a height value of the float from the height value of the humidification chamber corresponding to each intersection point according to the first number of segment, the second number of segment, and the third number of segment;
before generating the grayscale reference line and the grayscale image curve based on the current grayscale image data, the method further comprises:
determining current grayscale image parameters based on the current grayscale image data, the current grayscale image parameters comprise a minimum value and an average value of the current grayscale image data;

the generating the grayscale reference line based on the current grayscale image data comprises:

selecting a first threshold value, a second threshold value, and a third threshold value from a numerical interval corresponding to the minimum value and the average value of the current grayscale image data; and generating the first sub-grayscale reference line, the second sub-grayscale reference line and the third sub-grayscale reference line by respectively using the first threshold value, the second threshold value and the third threshold value as a segmentation reference.

\* \* \* \* \*